US012217067B2

(12) United States Patent
LaForge et al.

(10) Patent No.: US 12,217,067 B2
(45) Date of Patent: Feb. 4, 2025

(54) SYSTEMS AND METHODS FOR DYNAMICALLY GENERATING CONTEXT AWARE ACTIVE ICONS ON A MOBILE DEVICE

(71) Applicant: Fotobom Media, Inc., Ladera Ranch, CA (US)

(72) Inventors: Andrew Michael LaForge, San Clemente, CA (US); Perry Michael LaForge, San Clemente, CA (US); Ryan J. Nobrega, San Mateo, CA (US); Basil Munit Abifaker, San Diego, CA (US)

(*) Notice: Subject to any disclaimer, the term of this patent is extended or adjusted under 35 U.S.C. 154(b) by 0 days.

(21) Appl. No.: 18/307,326

(22) Filed: Apr. 26, 2023

(65) Prior Publication Data

US 2023/0409352 A1    Dec. 21, 2023

Related U.S. Application Data

(60) Provisional application No. 63/363,660, filed on Apr. 27, 2022.

(51) Int. Cl.
| | |
|---|---|
| *G06F 9/451* | (2018.01) |
| *G06F 3/04817* | (2022.01) |
| *G06F 16/95* | (2019.01) |
| *G06F 16/9535* | (2019.01) |
| *G06F 16/954* | (2019.01) |
| *G06F 16/955* | (2019.01) |

(52) U.S. Cl.
CPC .......... *G06F 9/451* (2018.02); *G06F 3/04817* (2013.01); *G06F 16/954* (2019.01); *G06F 16/955* (2019.01); *G06F 16/9535* (2019.01)

(58) Field of Classification Search
CPC .... G06F 9/451; G06F 3/04817; G06F 16/954; G06F 16/955
See application file for complete search history.

(56) References Cited

U.S. PATENT DOCUMENTS

| | | | | |
|---|---|---|---|---|
| 9,519,917 | B2* | 12/2016 | Geiger | G06F 40/295 |
| 10,535,005 | B1* | 1/2020 | Badr | G06F 3/0482 |
| 2015/0277702 | A1* | 10/2015 | Hardwick | G06F 3/04842 |
| | | | | 715/835 |
| 2016/0360382 | A1* | 12/2016 | Gross | G06F 9/445 |
| 2017/0039291 | A1* | 2/2017 | Singh | H04L 67/01 |
| 2017/0041437 | A1* | 2/2017 | Singh | G06F 9/44505 |
| 2017/0357443 | A1* | 12/2017 | Paek | G06F 3/0482 |
| 2017/0357521 | A1* | 12/2017 | Paek | G06F 3/0488 |
| 2017/0357916 | A1* | 12/2017 | Shelby | G06Q 10/02 |
| 2018/0367484 | A1* | 12/2018 | Rodriguez | H04L 67/75 |

(Continued)

*Primary Examiner* — Asher D Kells
(74) *Attorney, Agent, or Firm* — Novel IP

(57) ABSTRACT

The present specification describes systems and methods of generating and displaying at least one context aware active icon, virtual or graphical user interface object based on contextual and/or user attribute data acquired in response to a user using an application program or accessing a website/webpage on their computing device. In various embodiments, the at least one virtual object is visually overlaid on top of the application program or the website/webpage. The at least one graphical user interface object includes a URL or pointer directed towards launching another application program, evoking a functionality of another application program and/or launching another website/webpage on the user's computing device.

20 Claims, 16 Drawing Sheets

(56) References Cited

U.S. PATENT DOCUMENTS

| | | | |
|---|---|---|---|
| 2019/0014205 A1* | 1/2019 | Miloseski | H04M 1/72451 |
| 2019/0289128 A1* | 9/2019 | Baruah | H04M 1/72451 |
| 2022/0148587 A1* | 5/2022 | Drummie | G06F 16/90332 |
| 2022/0245520 A1* | 8/2022 | Wantland | G06F 40/30 |
| 2023/0418636 A1* | 12/2023 | Al Majid | G06F 3/04817 |

* cited by examiner

Action button can detect search queries from the page and link to other Apps, web pages, or chatbots 918a — The client-side action overlay module generates a first 'action button' that is either displayed in a graphical user interface overlaid on top of the first application program or is displayed embedded in the graphical user interface of the first application program.

920a — When the user clicks the first 'action button', the client-side action overlay module executes a subsequent course of action based on the first pointer or URL.

FIG. 9A (Cont.)

SYSTEMS AND METHODS FOR DYNAMICALLY GENERATING CONTEXT AWARE ACTIVE ICONS ON A MOBILE DEVICE

CROSS-REFERENCE

The present specification relies upon U.S. Patent Provisional Application No. 63/363,660, titled "Systems and Methods for Dynamically Generating Context Aware Active Icons on a Mobile Device", and filed on Apr. 27, 2022, for priority. The above-mentioned application is herein incorporated by reference in its entirety.

FIELD

The present specification relates generally to dynamically generating and displaying active icons in a display of a mobile device that may be contextually related to a user's activities in real-time and/or attribute data of the user. More specifically, the present specification relates to systems and methods for generating and displaying an active object or icon in a mobile device that, when actuated, causes an appropriate application, a portion of an appropriate application or an appropriate website/webpage associated with the user's contextual and/or attribute data, to be directly launched in the mobile device.

BACKGROUND

When using their computing devices, particularly mobile devices or smartphones, users are increasingly inundated with numerous application programs and websites that must be found, launched, and then navigated within in order to perform one or more desired functions or actions. If a user has several dozen applications on his or her phone, it can therefore take time to go from a text-based conversation, determine a new action needs to be taken based on the text conversation, identify another relevant application to perform that new action, launch that application, navigate that application, and then perform that new action. As a result, users find that, with the proliferation of more and more mobile applications, their viewing and functionality experiences across many different application programs and websites becomes less optimal. For example, it may not be intuitive for a user to utilize the functionality of a second application program or a website while interacting within a first application program. In addition, current application programming lacks in being able to adequately track a user's activity on an application program or website access and dynamically or intelligently recommending appropriate actions and functionalities related to other application programs and/or websites.

Conventionally, cookies are used to track user activities on a computing device. However, cookies are limited to browser applications only and are limited in scope to a single website. Stated differently, each website has its own cookie data that only that website can access and change; no website can view or change cookie data for another website. Consequently, a cookie is utilized by a website to maintain a stateful relationship with a user's web browser (for a variety of purposes, including tracking) but cookies cannot be used by, for example, non-browser application programs that represent third parties to the user's web browser/website relationship.

Therefore, there is a need for computer-implemented systems and methods for tracking user activity on third-party application programs and/or the user's access to a specific website or webpage and intelligently recommend at least one subsequent action to the user. There is also a need for embedding at least one action within a virtual object that is displayed to the user and overlaid on top of a current application program or website/webpage with which the user is interacting.

SUMMARY

The following embodiments and aspects thereof are described and illustrated in conjunction with systems, tools, and methods, which are meant to be exemplary and illustrative, and not limiting in scope. The present application discloses numerous embodiments.

The present specification is directed toward a method of generating and displaying a graphical user interface object in response to a user using a first application program on a computing device, wherein the computing device executes a client-side module in data communication with a server-side module implemented on at least one server, and wherein the first application program is in data communication with the client-side module, the method comprising: fetching, via the client-side module, first data from a database associated with the at least one server; generating contextual data based on a usage of the first application program; communicating, using the first application program, the contextual data to the client-side module in real-time; determining, using the client-side module, at least one portion of the contextual data based on the first data or at least one portion of the first data based on the contextual data; communicating, using the client-side module, the determined at least one portion of the contextual data and/or at least one portion of the first data to the server-side module; determining, using the server-side module, at least one action based on the at least one portion of the contextual data and/or the at least one portion of the first data, wherein the at least one action includes causing an interface in the computing device to electronically navigate to a virtual location based on a pointer, a virtual address, or a URL; communicating, using the server-side module, the at least one action to the client-side module; and generating, using the client-side module, the graphical user interface object for display on the computing device, wherein the graphical user interface object is visually overlaid on top of the first application program and wherein, when the graphical user interface object is activated, the computing device is caused to engage in the at least one action by electronically navigating, via said interface, to the virtual location based on the pointer, the virtual address, or the URL.

Optionally, the pointer or the URL is embedded in the graphical user interface object.

Optionally, the virtual location corresponds to a second application program, and wherein, when the graphical user interface object is activated, the client-side module causes the second application program to be launched on the computing device.

Optionally, the virtual location corresponds to a functionality of a second application program, and wherein, when the graphical user interface object is activated, the client-side module evokes the functionality of the second application program on the computing device.

Optionally, the virtual location corresponds to a website or webpage, and wherein, when the graphical user interface object is activated, the client-side module causes the website or webpage to be launched in a web browser on the computing device.

Optionally, the web browser is implemented by the client-side module, and wherein the graphical user interface object is embedded in a graphical user interface of the web browser.

Optionally, the virtual location corresponding to the at least one action is determined based at least in part on data characterizing one or more user attributes.

Optionally, the data characterizing one or more user attributes comprises at least one of a current location of the user, a date and a time associated with the computing device of the user, a type of the computing device of the user, data indicative of one or more application programs installed on the computing device of the user, an Internet service provider of the user, or the user's demographic information.

Optionally, the first data comprises a list of keywords.

Optionally, the determining, using the client-side module, of at least one portion of the contextual data based on the first data comprises matches at least one portion of the contextual data to at least one of the keywords from the list.

In some embodiments, the present specification is directed towards a method of generating and displaying a graphical user interface object in response to a user loading a first webpage in a web browser on the user's computing device, wherein the computing device executes a client-side module in data communication with a server-side module implemented on at least one server, the method comprising: fetching, using the client-side module, a list of URL patterns and/or keywords from a database associated with the at least one server; generating contextual data based on a first URL inputted into the web browser and loading the first webpage; communicating, using the web browser, the contextual data to the client-side module in real-time; determining, using the client-side module, at least one portion of the contextual data that matches at least one URL pattern and/or keyword from the list; communicating, using the client-side module, the matched at least one portion of the contextual data, the at least one URL pattern and/or the at least one URL keyword to the server-side module; determining, using the server-side module, at least one action based on the matched at least one portion of the contextual data, the at least one URL pattern and/or the at least one URL keyword, wherein the at least one action comprises causing the computing device to launch at least one of a function, a destination application, or a destination webpage based on a second pointer or a second URL; communicating, using the server-side module, the at least one action to the client-side module; and generating, using the client-side module, the graphical user interface object for display on the computing device, wherein the graphical user interface object is visually overlaid on top of the first webpage and wherein, when the graphical user interface object is activated, the computing device navigates to a second pointer or a second URL.

Optionally, the second pointer or the second URL is embedded in the graphical user interface object.

Optionally, when the graphical user interface object is activated, the client-side module causes the destination application to be launched on the computing device.

Optionally, when the graphical user interface object is activated, the client-side module evokes the function from a second application program executing on the computing device.

Optionally, when the graphical user interface object is activated, the client-side module causes the destination webpage to be launched in the computing device.

Optionally, the graphical user interface object is embedded in the graphical user interface of the web browser.

Optionally, the at least one action is determined based on data indicative of one or more user attributes.

Optionally, the data indicative of one or more user attributes comprises at least one of a current location of the user, a date and a time associated with the computing device of the user, a type of the computing device of the user, data indicative of one or more application programs installed on the computing device of the user, an Internet service provider of the user, and the user's demographic information.

In some embodiments, the present specification is directed toward a method of generating and displaying at least one virtual object in response to a user using a first application program on their computing device, wherein the computing device executes a client-side module in data communication with a server-side module implemented on at least one server, and wherein the first application program is in data communication with the client-side module, the method comprising: generating contextual data based on a usage of the first application program; periodically fetching, via the client-side module, first data from a database associated with the at least one server; communicating, using the first application program, the contextual data to the client-side module in real-time; determining, using the client-side module, at least one portion of the contextual data based on at least one portion of the first data; communicating, using the client-side module, the determined at least one portion of the contextual data and/or the at least one portion of the first data to the server-side module; determining, using the server-side module, a first action based on the determined at least one portion of the contextual data and/or the at least one portion of the first data, wherein the first action includes causing the computing device to navigate to a first pointer or a first URL; communicating, using the server-side module, the first action to the client-side module; generating, using the client-side module, a first virtual object having the first pointer or the first URL embedded therein, wherein the first virtual object is configured to be visually overlaid on top of the first application program; and launching, using the client-side module, a website or webpage in a web browser in response to a user interacting with the first virtual object, wherein the website or webpage is based on the first pointer or the first URL.

Optionally, the web browser is implemented by the client-side module, and wherein the first virtual object is embedded in the graphical user interface of the web browser.

Optionally, the method further comprises communicating, using the web browser, the first pointer or the first URL to the client-side module in real-time; fetching, using the client-side module, a list of URL patterns from the database associated with the at least one server; determining, using the client-side module, at least one portion of the first pointer or the first URL that matches at least one URL pattern from the list of URL patterns; communicating, using the client-side module, the determined at least one portion of the first pointer, the at least one first URL, and/or the at least one URL pattern to the server-side module; determining, using the server-side module, a second action associated with the at least one portion of the first pointer, the at least one first URL and/or the at least one URL pattern, wherein the second action includes causing the computing device to navigate to a location based on a second pointer or a second URL; communicating, using the server-side module, the second action to the client-side module; and generating, using the client-side module, a second virtual object for display on the computing device, wherein the second virtual object is visually overlaid on top of a webpage and wherein, when the second virtual object is activated, the computing device navigates to the location based on a second pointer or a second URL.

Optionally, the second pointer or the second URL is embedded in the second virtual object, and wherein the second pointer or the second URL corresponds to a second application program, a functionality of the second application program or another webpage.

In some embodiments, the present specification discloses a method of generating and displaying a graphical user interface object in response to a user using a first application program on a computing device, wherein the computing device executes a client-side module in data communication with a server-side module implemented on at least one server, and wherein the first application program integrates with the client-side module, the method comprising: fetching, via the client-side module, a list of keywords from a database associated with the at least one server; generating, via the user, contextual data as a result of usage of the first application program; communicating, using the first application program, the contextual data to the client-side module in real-time; determining, using the client-side module, at least one portion of the contextual data that matches at least one keyword from the list; communicating, using the client-side module, the matched at least one portion of the contextual data and/or the at least one keyword to the server-side module; determining, using the server-side module, at least one action associated with the matched at least one portion of the contextual data and/or the at least one keyword, wherein the at least one action includes a pointer, virtual address, or URL; communicating, using the server-side module, the at least one action to the client-side module; and generating, using the client-side module, the graphical user interface object for display on the computing device, wherein the graphical user interface object is visually overlaid on top of the first application program.

Optionally, the pointer or URL is embedded in the graphical user interface object. Optionally, the pointer or URL corresponds to a second application program, wherein when the user clicks the virtual object the client-side module causes the second application program to be launched on the computing device. Optionally, the pointer or URL corresponds to a functionality of a second application program, wherein when the user clicks the graphical user interface object the client-side module evokes the functionality of the second application program on the computing device. Optionally, the pointer or URL corresponds to a website or webpage, wherein when the user clicks the graphical user interface object the client-side module causes the website or webpage to be launched in a web browser on the computing device. Optionally, the web browser is implemented by the client-side module.

Optionally, the at least one action is determined based on user attribute data in addition to the matched at least one portion of the contextual data and/or the at least one keyword. Optionally, the user attribute data comprises at least one of a current location of the user, a type of the computing device of the user, data indicative of one or more application programs installed on the computing device of the user, an Internet service provider of the user, and the user's demographic information.

In some embodiments, the present specification also discloses a method of generating and displaying a graphical user interface object in response to a user loading a first website/webpage in a web browser on their computing device, wherein the computing device executes a client-side module in data communication with a server-side module implemented on at least one server, the method comprising: fetching, using the client-side module, a list of URL patterns from a database associated with the at least one server; generating, via the user, contextual data corresponding to the user inputting a first URL in the web browser; communicating, using the web browser, the contextual data to the client-side module in real-time; determining, using the client-side module, at least one portion of the contextual data that matches at least one URL pattern from the list; communicating, using the client-side module, the matched at least one portion of the contextual data and/or the at least one URL pattern to the server-side module; determining, using the server-side module, at least one action associated with the matched at least one portion of the contextual data and/or the at least one URL pattern, wherein the at least one action includes a second pointer or URL; communicating, using the server-side module, the at least one action to the client-side module; and generating, using the client-side module, the graphical user interface object for display on the computing device, wherein the graphical user interface object is visually overlaid on top of the first website/webpage.

Optionally, the second pointer or URL is embedded in the graphical user interface object. Optionally, the second pointer or URL corresponds to an application program, wherein when the user clicks the graphical user interface object the client-side module causes the application program to be launched on the computing device. Optionally, the second pointer or URL corresponds to a functionality of an application program, wherein when the user clicks the graphical user interface object the client-side module evokes the functionality of the application program on the computing device. Optionally, the second pointer or URL corresponds to a second website/webpage, wherein when the user clicks the graphical user interface object the client-side module causes the second website/webpage to be launched in the web browser on the computing device. Optionally, the web browser is implemented by the client-side module.

Optionally, the at least one action is determined based on user attribute data in addition to the matched at least one portion of the contextual data and/or the at least one URL pattern. Optionally, the user attribute data comprises at least one of a current location of the user, a type of the computing device of the user, data indicative of one or more application programs installed on the computing device of the user, an Internet service provider of the user, and the user's demographic information.

In some embodiments, the present specification also discloses a method of generating and displaying at least one virtual object in response to a user using a first application program on their computing device, wherein the computing device executes a client-side module in data communication with a server-side module implemented on at least one server, and wherein the first application program integrates with the client-side module, the method comprising: fetching, via the client-side module, a list of keywords from a database associated with the at least one server; generating, via the user, contextual data as a result of usage of the first application program; communicating, using the first application program, the contextual data to the client-side module in real-time; determining, using the client-side module, at least one portion of the contextual data that matches at least one keyword from the list; communicating, using the client-side module, the matched at least one portion of the contextual data and/or the at least one keyword to the server-side module; determining, using the server-side module, a first action associated with the matched at least one portion of the contextual data and/or the at least one keyword, wherein the first action includes a first pointer or URL; communicating, using the server-side module, the first action to the client-side module; generating, using the client-side module, a first virtual object for display on the computing device, wherein the first virtual object is visually overlaid on top of the first application program, and wherein the first pointer or URL is embedded in the first virtual object; and launching, using the client-side module, a website or webpage in a web browser in response to the user clicking the first virtual object, wherein the website or webpage corresponds to the first pointer or URL.

Optionally, the web browser is implemented by the client-side module.

Optionally, the method of further comprises: communicating, using the web browser, the first pointer or URL to the client-side module in real-time; fetching, using the client-side module, a list of URL patterns from the database associated with the at least one server; determining, using the client-side module, at least one portion of the first pointer or URL that matches at least one URL pattern from the list of URL patterns; communicating, using the client-side module, the matched at least one portion of the first pointer or URL and/or the at least one URL pattern to the server-side module; determining, using the server-side module, a second action associated with the matched at least one portion of the first pointer or URL and/or the at least one URL pattern, wherein the second action includes a second pointer or URL; communicating, using the server-side module, the second action to the client-side module; and generating, using the client-side module, a second virtual object for display on the computing device, wherein the second virtual object is visually overlaid on top of the website/webpage. Optionally, the second pointer or URL is embedded in the second virtual object, wherein the second pointer or URL corresponds to a second application program, a functionality of the second application program or another website/webpage.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3 illustrates a first "action button" that, when selected/clicked, activates or launches a website/webpage, in accordance with some embodiments of the present specification;

FIG. 5A illustrates a third "action button" that, when selected/clicked, activates, or launches an application program, in accordance with some embodiments of the present specification;

DETAILED DESCRIPTION

Figure 1:
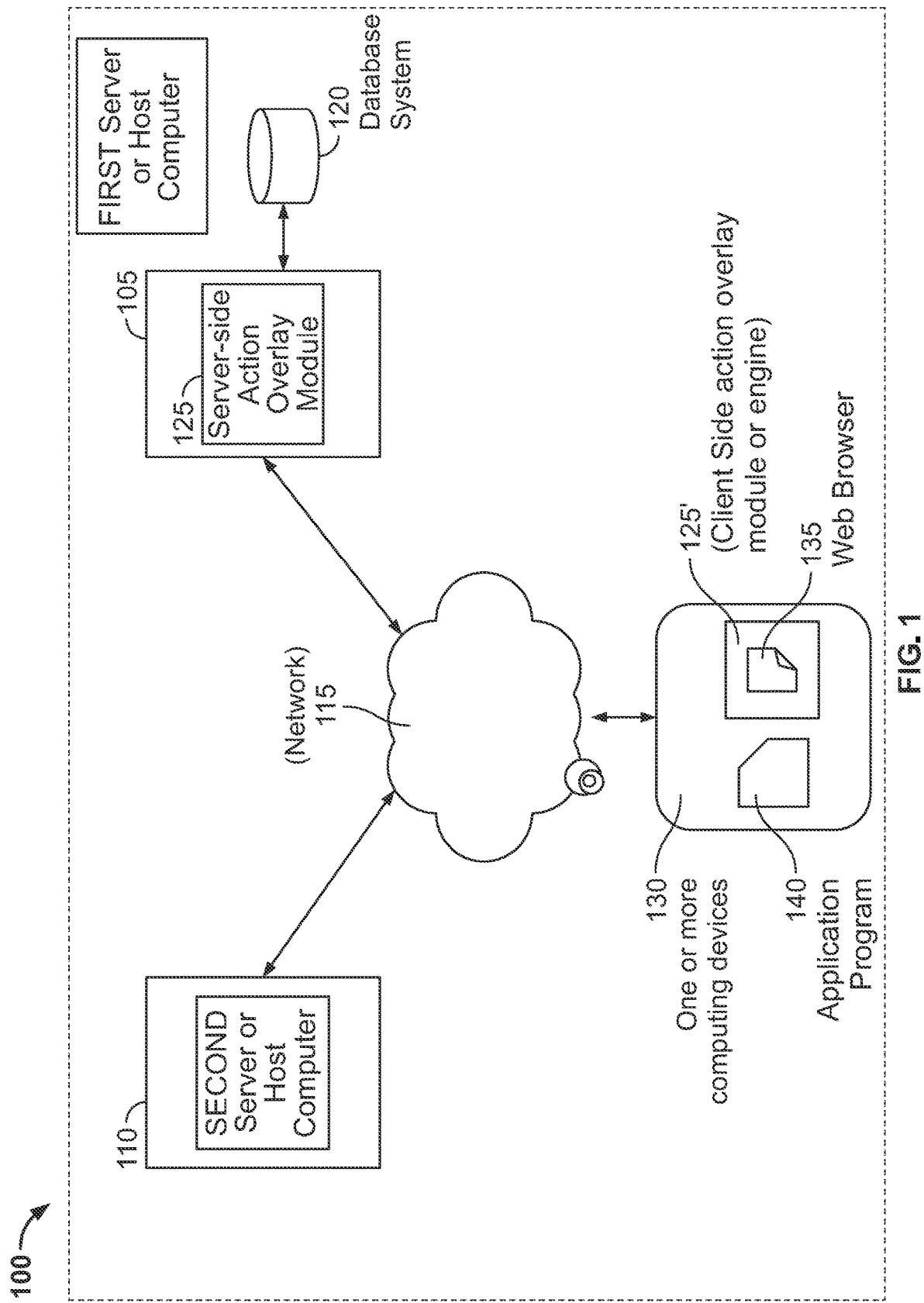
FIG. 1 is a block diagram of an exemplary environment in which the systems and methods of the present specification may be implemented or executed, in accordance with some embodiments.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code enable or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine is configured to implement a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

Further it should be noted that each module, application or engine is configured to perform the functions described herein. Still further, each action button is configured to perform the action(s) described herein.

The term "chatbot" means a communication service hosted by an application and/or server system that is configured to receive data from a first application, via the icons, buttons, links, or other graphical user interface elements described herein, and provide a contextual response to such data (within the application of the communication service or exported to said first application) to thereby initiate a two-way dialogue between the user and the communication service. In one embodiment, the two-way dialogue is configured to receive responses from the user and respond to said responses using a neural network and/or artificial intelligence that is adapted to receive data, process the data, and provide a tailored response specific to the data received. In various embodiments, any of a plurality of chatbot types including those chatbots powered by generative artificial intelligence; search chatbots, and/or a Rich Communication Services (RCS) chatbot may be employed in the systems and methods of the present specification.

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

It should be appreciated that the present invention is directed toward the uniquely technological problem of enabling the efficient and rapid accessing of data from a second application that is separate from, and independent of, a data stream in a text or messaging application, both the text or messaging application and second application being configured to execute in a mobile device. The systems and methods of the present invention are enabled by a server is configured to present icons, buttons or other elements of graphical user interfaces, as described herein, to over at least 50 client devices concurrently and/or host at least 10 transactions per second concurrently. The server systems disclosed herein are preferably configured to concurrently host at least 50 client devices, and more preferably 50 to 750,000 client devices or any increment therein, such that each of said at least 50 client devices are served tailored graphical user icons, relevant to text data stream.

Overview

FIG. 1 illustrates an embodiment of an environment 100 in which the systems and methods of the present specification may be implemented or executed, in accordance with some embodiments. Referring now to FIG. 1, environment 100 comprises at least one first server or host computer 105 and at least one second server or host computer 110 in data communication with one or more computing devices 130 over a network 115. Users may operate their respective computing devices 130 in order to access one or more application programs and/or one or more websites within the environment 100. While only one computing device 130 is illustrated in FIG. 1, persons of ordinary skill in the art would understand that the environment 100 may include a plurality of computing devices. The one or more computing devices 130 comprise devices such as, but not limited to, personal or desktop computers, laptops, Netbooks, handheld devices such as smartphones, tablets, and PDAs, gaming consoles and/or any other computing platform known to persons of ordinary skill in the art. Although a single computing device 130 is illustrated in FIG. 1, any number of computing devices 130 can be in communication with the first server or host computer 105 and second server or host computer 110 over the network 115.

Each of the at least one first and second servers or host computers 105, 110 can be any computing devices having one or more processors and one or more computer-readable storage media such as RAM, hard disk or any other optical or magnetic media. The at least one first server or host computer 105 may include at least one module configured to provide or implement a plurality of functional, operational or service-oriented methods of the present specification. In some embodiments, the at least one first server or host computer 105 includes or is in communication with at least one database system 120. In some embodiments, the at least one first server or host computer 105 may be implemented by a cloud of computing platforms operating together as servers or host computers 105.

In accordance with aspects of the present specification, the at least one first server or host computer 105 is configured to provide or implement a server-side action overlay module or engine 125 that is in data communication with a client-side action overlay module or engine 125', which the user's computing device 130 is configured to provide and/or implement. In various embodiments, the modules 125, 125' are configured to implement a plurality of programmatic instructions or code, which, when executed, intelligently generate and display at least one active object, active icon or user-clickable virtual object or icon (hereinafter referred to as an "action button") on the user's computing device 130 in response to the user enabling, accessing or interacting with an application program 140 and/or a website/webpage (in a web browser 135) on the computing device 130. In some embodiments, the web browser 135 is accessed or implemented using a keyword extension or keyboard application. The keyboard extension or keyboard application is configured to cause the module 125' to invoke the web browser 135 via a predefined user action or input.

The "action button" has a plurality of characteristics, described in the text that follows. Firstly, in some embodiments, the "action button" is generated and displayed outside of and separate from the application program 140 and the website/webpage (loaded in the web browser 135).

Secondly, in some embodiments, the "action button" is overlaid onto the application program 140 or the website/webpage (in the web browser 135) being accessed by the user. In some embodiments, the "action button" is displayed within a graphical user interface, generated by the client-side action overlay module 125', that is overlaid on top of the application program 140 or the website/webpage being viewed in the web browser 135. In alternate embodiments, the "action button" is generated or embedded directly within the graphical user interface of the application program 140 and/or of the web browser 135 being used to view the website/webpage. That is, the "action button" is part of the interface of the application program 140 and/or the interface of the web browser 135. Thus, as a non-limiting example, in addition to being displayed in a graphical user interface that is overlaid on the web browser 135, the "action button" can also be embedded directly into the web browser 135 as an "extension", "browser application", or part of a customized webview. It should be appreciated that the "action button" is not part of the website/webpage itself but is in the web browser 135 interface. It should also be appreciated that the web browser 135, with the embedded "action button" may either be overlaid on top of an underlying application program or the web browser 135 may take up an entire display screen of the user's computing device 130.

Thirdly, in various embodiments, the "action button" includes an embedded pointer or URL (Uniform Resource Locator) such that clicking the "action button" by the user causes at least one of the following actions or functions to be performed: launching another application program installed locally on the user's mobile device and/or another website accessible by the user's computing device 130.

Fourthly, the "action button" is intelligently generated in that the embedded pointer or URL is aware of and therefore relevant to the linguistic and/or semantic context in which the user has accessed the application program 140 (even though the application program is a third-party, stand-alone program distinct from the modules 125, 125'), the specific website being accessed by the user and/or the context in which the website is being accessed (in the web browser 135)—that is, the context of the user's browsing experience, and the context of the user's interaction with and activity within the application program 140—such as, for example, the context of the user's recent messaging conversation history on an instant messaging application (wherein the application program 140 is an instant messaging application, for example). In additional or alternative embodiments, the "action button" is intelligently generated—thus, the embedded pointer or URL is aware of and therefore relevant in the context of other user attributes such as, but not limited to, the current location of the user (from the geographical location of the user's computing device 130), the current date and time from the user's computing device 130, the type of the computing device 130, various application programs installed locally on the computing device 130, the Internet service provider of the user, and the user's demographic information.

Accordingly, in some embodiments, the modules 125, 125' access, receive and use a plurality of i) contextual data corresponding to the context in which the user has accessed the application program 140, the specific website that the user has accessed and/or the context in which the website is being accessed (in the web browser 135)—that is, the context of the user's browsing experience, and the context of the user's interaction with and activity within the application program 140—such as, for example, the context of the user's recent messaging conversation history on an instant messaging application (wherein the application program 140 is an instant messaging application, for example), and/or ii) user attribute data corresponding to, for example, the current location of the user, the current date and time from the user's computing device 130, the type of the computing device 130, various application programs installed locally on the computing device 130, the Internet service provider of the user, and the user's demographic information. In other words, the modules 125, 125' may access, receive, or use only contextual data, only user attribute data or a combination of contextual and user attribute data in order to generate and display an "action button".

In various embodiments, the module 125' is configured to actively execute on the user's computing device 130 and is in data communication with the module 125 which is configured to actively execute on the at least one first server or host computer 105, while the user accesses and interacts with the application program 140 and/or navigates the web in order to acquire contextual data and/or user attribute data. In some embodiments, the modules 125, 125' are configured to use artificial intelligence (AI) and natural language processing to analyze the acquired contextual data and/or user attribute data, synthesize the analyzed contextual data and/or user attribute data in order to determine the user's 'likely intent' (such as a likely intent to purchase a ticket, for example), and then generate and display an "action button" based on the 'likely intent'.

In various embodiments, at least one of the modules 125, 125' is configured to generate and display the "action button". Also, in various embodiments, at least one of the modules 125, 125' is configured to either perform or utilize the functionalities of a suggestion engine, search engine, AI chatbot, and/or natural language processor in order to synthesize the analyzed contextual data and/or user attribute data in order to determine the user's 'likely intent', and then generate and display an "action button" based on the 'likely intent'.

It should be appreciated that the tasks of acquiring contextual data and/or user attribute data, using artificial intelligence (AI) and natural language processing to analyze the acquired contextual data and/or user attribute data, synthesizing the analyzed contextual data and/or user attribute data in order to determine the user's 'likely intent', and thereafter generating and displaying an "action button" based on the 'likely intent', are distributed between the modules 125, 125' for efficient processing, in various embodiments. As a non-limiting example, in some embodiments, module 125' (client-side) is configured to acquire contextual data and/or user attribute data and transmit to the module 125 (server-side) which is, in turn, configured to use AI and natural language processing to analyze the acquired contextual data and/or user attribute data, synthesize the analyzed contextual data and/or user attribute data in order to determine the user's 'likely intent', generate an "action button" based on the 'likely intent' and transmit data indicative of the "action button" to the module 125' (client-side) which is also configured to then display the "action button" to the user on the computing device 130. Thus, modules 125, 125' may perform different groups of such tasks, in various embodiments.

In some embodiments, the user attribute data such as, for example, various application programs installed locally on the computing device 130 is used to intelligently generate "action buttons" across application programs. In embodiments, when a first "action button" is generated in the context of a first application program, the modules 125, 125' acquire and store first data (hereinafter referred to as "first party data") indicative of contextual data related to the first application program as well as an indication of the presence of the first application program on the user's computing device 130. If the user now accesses a second application program, the modules 125, 125' may utilize the first party data while generating a second "action button" in the context of the second application program. To enable this functionality, the module 125' is associated with a unique identifier. Each time an "action button" is generated for an application program, an identification of along with contextual data related to the application program is stored (at the at least one first server 105 and/or the computing device 130) in association with the unique identifier of the module 125'. Thus, as "action buttons" are generated for a plurality of application programs the identifications and contextual data of each of the plurality of application programs get stored in association with the unique identifier of the module 125' thereby creating an application program profile indicative of the plurality of application programs present on the computing device 130. This further enables the modules 125, 125' to effectively share the first party data across multiple different applications.

In some embodiments, the application program 140 is a third-party program that is in data communication with the corresponding third-party second server or host computer 110 through the network 115. In some embodiments, the application program 140 is also in data communication with the at least one first server or host computer 105 through the network 115. In embodiments, modules or engines 125 and 125' are configured to integrate with application program 140 so that contextual data from the application program 140 is communicated to the modules or engines 125, 125' in real-time or near real-time. It should be appreciated that the contextual data from the application program 140 may be communicated to the modules or engines 125, 125' in at least one of the following ways: a) the contextual data may be communicated from the application program 140 directly to the client-side action overlay module or engine 125' which in turn may share the data with the server-side action overlay module or engine 125 on the first server 105, b) the contextual data may be communicated from the application program 140 to the server-side action overlay module or engine 125 on the first server 105 which in turn may share the data with the client-side action overlay module or engine 125', c) the contextual data may be communicated from the application program 140 to the second server 110, which in turn may communicate the data with the server-side action overlay module or engine 125 on the first server 105, and which in turn may share the data with the client-side action overlay module or engine 125', or d) the contextual data may be communicated from the application program 140 to the second server 110 which in turn may communicate the data with the client-side action overlay module or engine 125' and which in turn may share the data with the server-side action overlay module or engine 125.

Contextual data, in the case of the user accessing and interacting with the application program 140, is dependent on the type of application program. For example, if the application program 140 is a messaging application, then the associated contextual data is the content of the conversation that the user engages in within the messaging application. In another example, if the application program 140 is a newspaper application, then the associated contextual data is the content of the news that the user is reading at any point in time. In yet another example, if the application program 140 is an e-commerce application, then the associated contextual data is a product (and/or product category) or service that the user is searching or viewing at any point in time. As discussed earlier, since the application program 140 integrates with the modules 125, 125', the relevant contextual data is communicated by the application program 140 to the modules 125 and/or 125' in order to generate and display context-aware "action button" to the user.

In some embodiments, the database system 120 stores a plurality of data organized into one or more data structures, schemas, or relational tables. As an exemplary illustration, a first data structure may include: first data identifying each of a plurality of application programs that integrate with the modules 125, 125'; second data indicative of identification names, of a plurality of brands, organizations, personalities, and/or URLs or IP addresses of a plurality of websites/webpages; third data indicative of a plurality of keywords, phrases, text patterns, visual symbols, and icons relevant to and associated with each of the plurality of application programs and websites/webpages (it should be appreciated that, in some embodiments, the plurality of keywords, phrases, text patterns, visual symbols, and icons additionally include contextual data that users typically use while accessing, browsing, searching websites/webpages and/or while accessing and using the plurality of application programs); and fourth data indicative of at least one action corresponding to each of the plurality of keywords, phrases, text patterns, visual symbols, and icons. In various embodiments, an action may correspond to a pointer or URL directed towards launching another application program and/or another website/webpage on the user's computing device 130 in response to the user accessing, enabling or interacting with the application program 140 or the website/webpage in the web browser 135.

In embodiments, a second data structure may include user attribute data such as, but not limited to, fifth data indicative of a unique identification of the user (to track and identify the user across any and all activities related to the module 125' on the computing device 130); sixth data indicative of a current geographical location of the user (based on the user's computing device 130, for example); seventh data indicative of a type of the user's computing device 130 (smartphone, laptop, personal computer, tablet, etc.); eighth data indicative of a manufacturer of the user's computing device 130; ninth data indicative of an Internet service provider of the user (based on the Internet connection on the user's computing device 130); tenth data indicative of the user's demographic information (such as, for example, gender, age, country, date of birth, ethnicity, etc.); eleventh data indicative of various application programs installed locally on the user's computing device 130; and twelfth data indicative of a current date and time from the user's computing device 130. It should be appreciated that the user attribute data is available in the database system 120 upon the user downloading and registering the client-side action overlay module 125' on their computing device 130 and/or received from other application programs as part of their integration arrangement with the modules 125, 125'.

Exemplary First Use Case Scenario

Figure 2A:
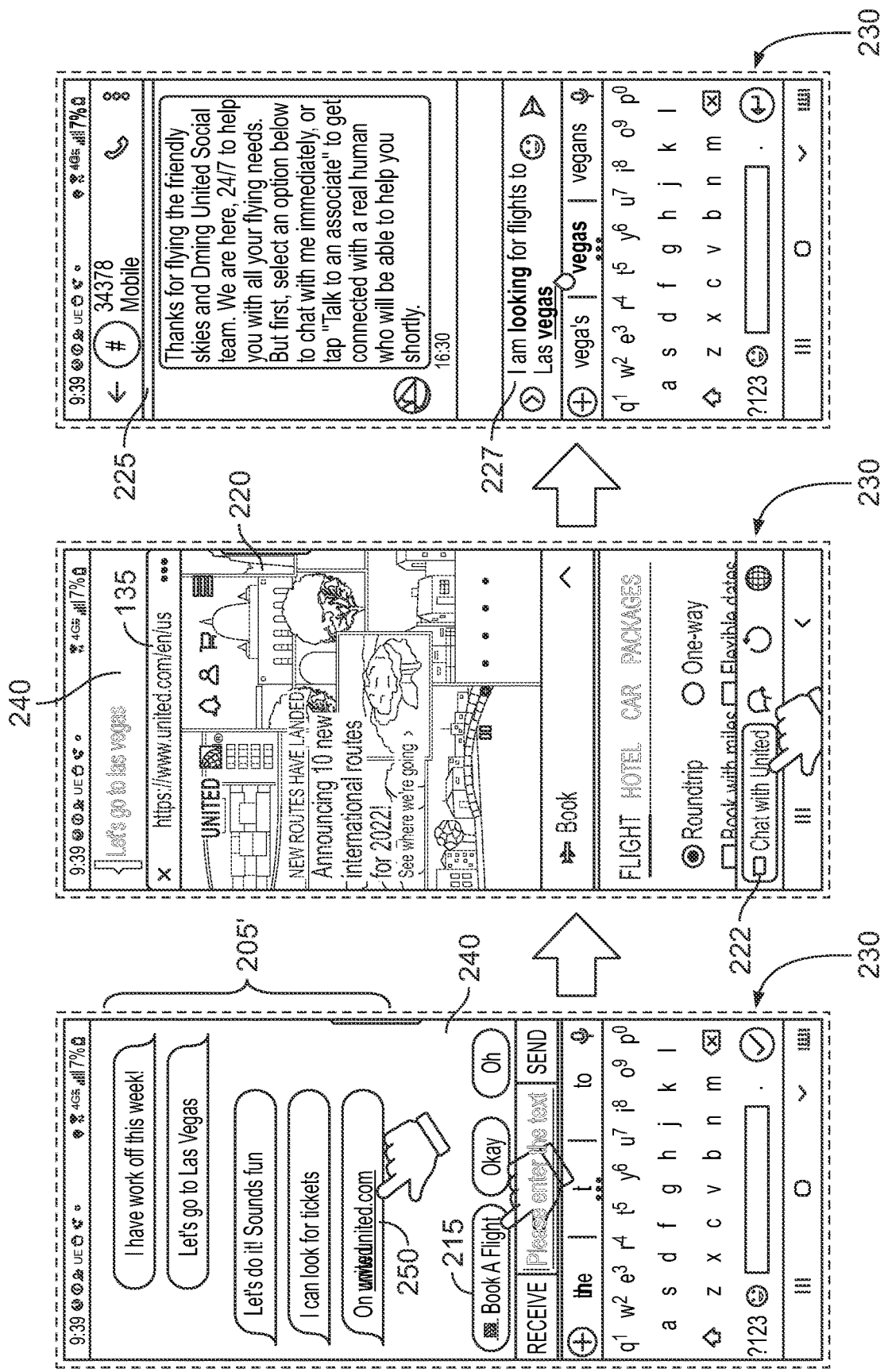
FIG. 2A illustrates a first use case scenario in which a user's contextual data, from an application program, is utilized to generate a first "action button" and a second "action button", in accordance with some embodiments of the present specification.
Figure 2B:
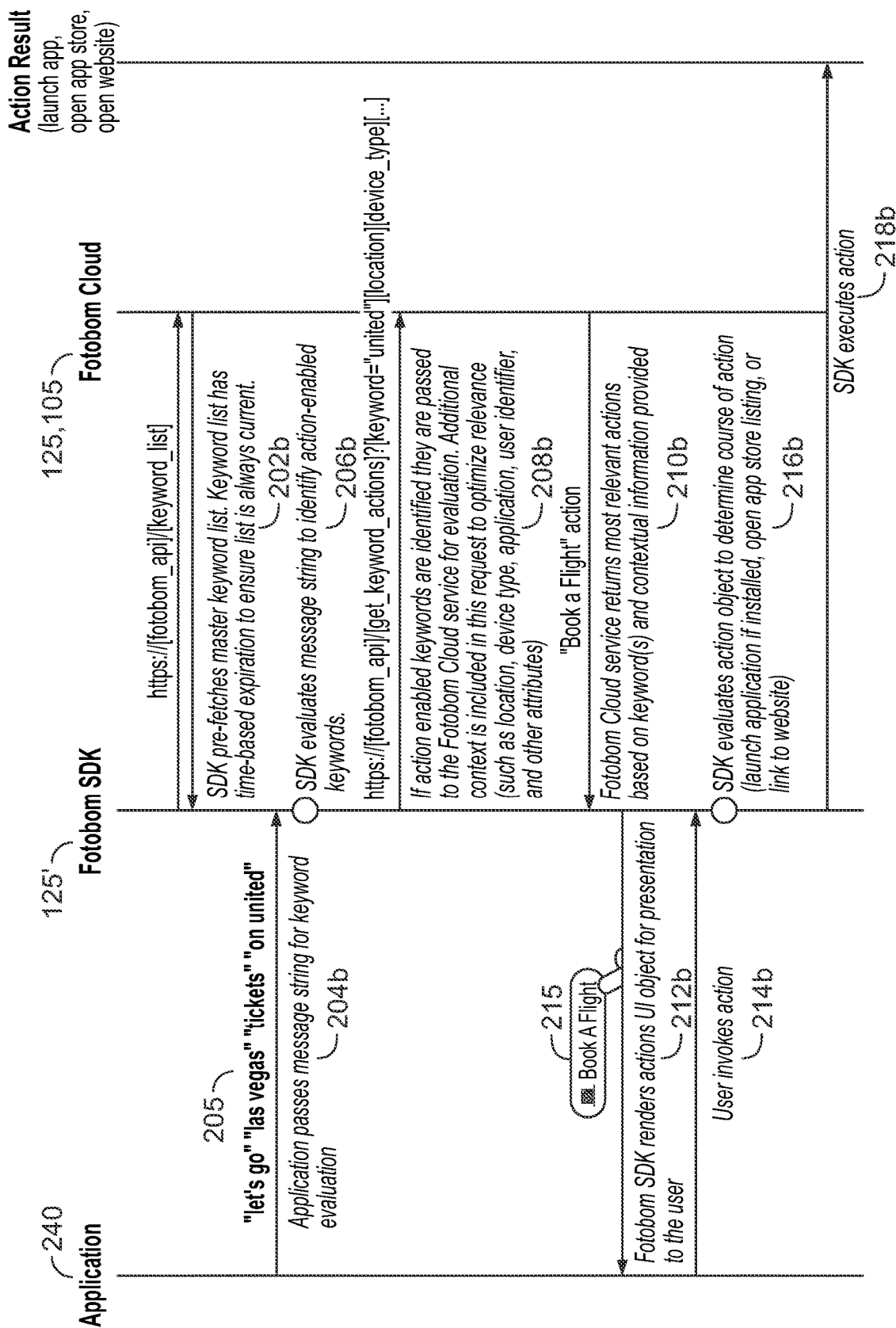
FIG. 2B is a process flow diagram corresponding to the first use case scenario, in accordance with some embodiments of the present specification.

FIG. 2A illustrates a first use case scenario in which a user's contextual data, from an application program, is utilized to generate first and second 'action buttons', while FIG. 2B is a process flow corresponding to the first use case scenario, in accordance with some embodiments of the present specification. Referring now to FIGS. 1, 2A and 2B, in the first use case scenario a user accesses a first application program, for example, a messaging application 240 on their computing device, which, in an embodiment, is a smartphone 230. The user enters into a conversation 205' with another user thereby generating contextual data 205 which constitutes multiple pieces of context (such as, but not limited to, keywords, phrases, and text patterns) from the content of the conversation 205'. The smartphone 230 also includes the client-side action overlay module 125' that, when executed, is in data communication with the server-side action overlay module 125 on the first server 105.

In various embodiments, the second pointer or URL may link the user to any of a plurality of chatbot types including those chatbots powered by generative artificial intelligence; search chatbots, and/or a Rich Communication Services (RCS) chatbot. While this example is presented using an RCS chatbot, it should be understood by those of ordinary skill in the art, that any type of chatbot may be employed to achieve the objectives of the inventions described herein and in no way is the RCS chatbot to be construed as limiting.

By way of example, a first data structure, as described above, may comprise first data indicative of a messaging application, for example, WhatsApp; second data indicative of an airline, for example, United Airlines; third data indicative of a plurality of keywords, phrases, and text patterns such as, for example, vacation, holiday, united, flight, and tickets; and fourth data indicative of an action that may be undertaken, for example, a URL pointing to a flight booking webpage of United Airlines which may be accessed upon clicking an "action button". In some embodiments, the third data may include keywords, phrases, text patterns, visual symbols, and icons that are based on the user's real-time or current conversation with another user in combination with the user's historic use of word patterns and expressions. In some embodiments, the keywords are activated or deactivated based on the user's historic use of word patterns and expressions. For example, if the user historically uses keywords related to football, then more football related keywords (such as Brady, Chargers, Dolphins, etc.) are activated for the user whereas if the user historically does not use football related keywords, then football related keywords would not be activated for the user.

At step 202b, the client-side action overlay module 125' pre-fetches a master list of a plurality of keywords, phrases, text patterns, expressions, visual symbols, and icons from the database system 120. In some embodiments, the master list includes a universal set of all possible keywords, phrases, text patterns, expressions, visual symbols, and icons. This master list is updated in real-time to add/remove or activate/deactivate keywords, phrases, text patterns, expressions, visual symbols, and icons based on the user's current conversation with another user along with the user's historic usage of words and phrases. In some embodiments, the master list has time-based expiration to ensure that the list on the smartphone 230 is always current. In accordance with an embodiment, the messaging application 240 integrates into the client-side action overlay module 125'. Consequently, at step 204b, the contextual data 205 is communicated from the messaging application 240 to the module 125' in real-time.

At step 206b, the client-side action overlay module 125' evaluates the contextual data 205 with respect to the pre-fetched master list of the plurality of keywords, phrases, text patterns, expressions, visual symbols, and icons in order to determine if the contextual data 205 includes at least one string that matches a keyword, phrases, text patterns, expressions, visual symbols, and icons from the master list. In the first use case scenario, multiple strings such as, for example, "let's go", "las vegas", "tickets and "on united" of the contextual data 205 matches the master list of keywords, phrases, text patterns, expressions, visual symbols, and icons.

If a matching string is identified between the contextual data 205 and the master list of keywords, phrases, text patterns, expressions, visual symbols, and icons then, at step 208b, the matching string is communicated by the client-side action overlay module 125' to the server-side action overlay module 125 at the first server 105. In some embodiments, additional data such as the user attribute data is also communicated by the client-side action overlay module 125' to the server-side action overlay module 125.

In response, the server-side action overlay module 125 determines, from the database system 120, at least one action based on the matching string and/or the user attribute data and communicates, at step 210b, the at least one action back to the client-side action overlay module 125'. In various embodiments, the action may correspond to a pointer or URL directed towards launching another application program and/or another website/webpage on the user's computing device 130. In the first use case scenario, a first action corresponds to enabling the user to "book a flight" on "United Airlines". Therefore, the first action corresponds to a first pointer or URL to a flight booking webpage on the website of United Airlines.

Consequently, at step 212b, the client-side action overlay module 125' generates a first "action button" 215 that is displayed in a graphical user interface overlaid on top of the messaging application 240. In some embodiments, the graphical user interface is the web browser 135 that is overlaid on top of the messaging application 240. In alternate embodiments, the client-side action overlay module 125' may embed the first "action button" 215 directly within the interface of the messaging application 240. At step 214b, the user clicks the first "action button" 215. In response to the user clicking the first "action button" 215, the client-side action overlay module 125' determines, at step 216b, a subsequent course of action and executes the subsequent course of action, at step 218b. In various embodiments, the subsequent course of action may involve launching another application program and/or another website/webpage on the user's computing device 130. In the first use example, the first pointer or URL to the flight booking webpage, on the website of United Airlines, is embedded in the first "action button" 215.

In the first use case scenario of FIG. 2A, clicking the first "action button" 215 causes the web browser 135 on top of the messaging application 240 to load the flight booking webpage 220 (on the website of United Airlines) corresponding to the pointer or URL embedded in the first "action button" 215.

In accordance with some embodiments, the client-side action overlay module 125' further generates a second "action button" 222 that is displayed in the graphical user interface of the web browser 135 while the flight booking webpage 220 is also in display. Thus, in the first use case scenario, a second action may relate to enabling the user to interact with a chatbot, such as a RCS (Rich Communication Services) chatbot, for example. Therefore, the second action corresponds to a second pointer or URL to a chatbot application 225 associated with United Airlines. The second pointer or URL to the chatbot application 225 is embedded in the second "action button" 222.

In various embodiments, the second pointer or URL may link the user to any of a plurality of chatbot types including those chatbots powered by generative artificial intelligence; search chatbots, and/or a Rich Communication Services (RCS) chatbot.

When the user clicks the second "action button" 222, client-side action overlay module 125' causes the chatbot application 225 to be launched on the user's computing device 230. Note that the chatbot application 225 optionally opens with a smart reply or message 227 ready to be sent to the chatbot application 225. The smart reply or message 227 may be generated and pre-populated for the user based at least on the user's geographical location (user attribute data), contextual data 205 and the first pointer or URL to the flight booking webpage on the website of United Airlines. In some embodiments, the smart reply or message 227 is embedded in the second pointer or URL.

Figure 2C:
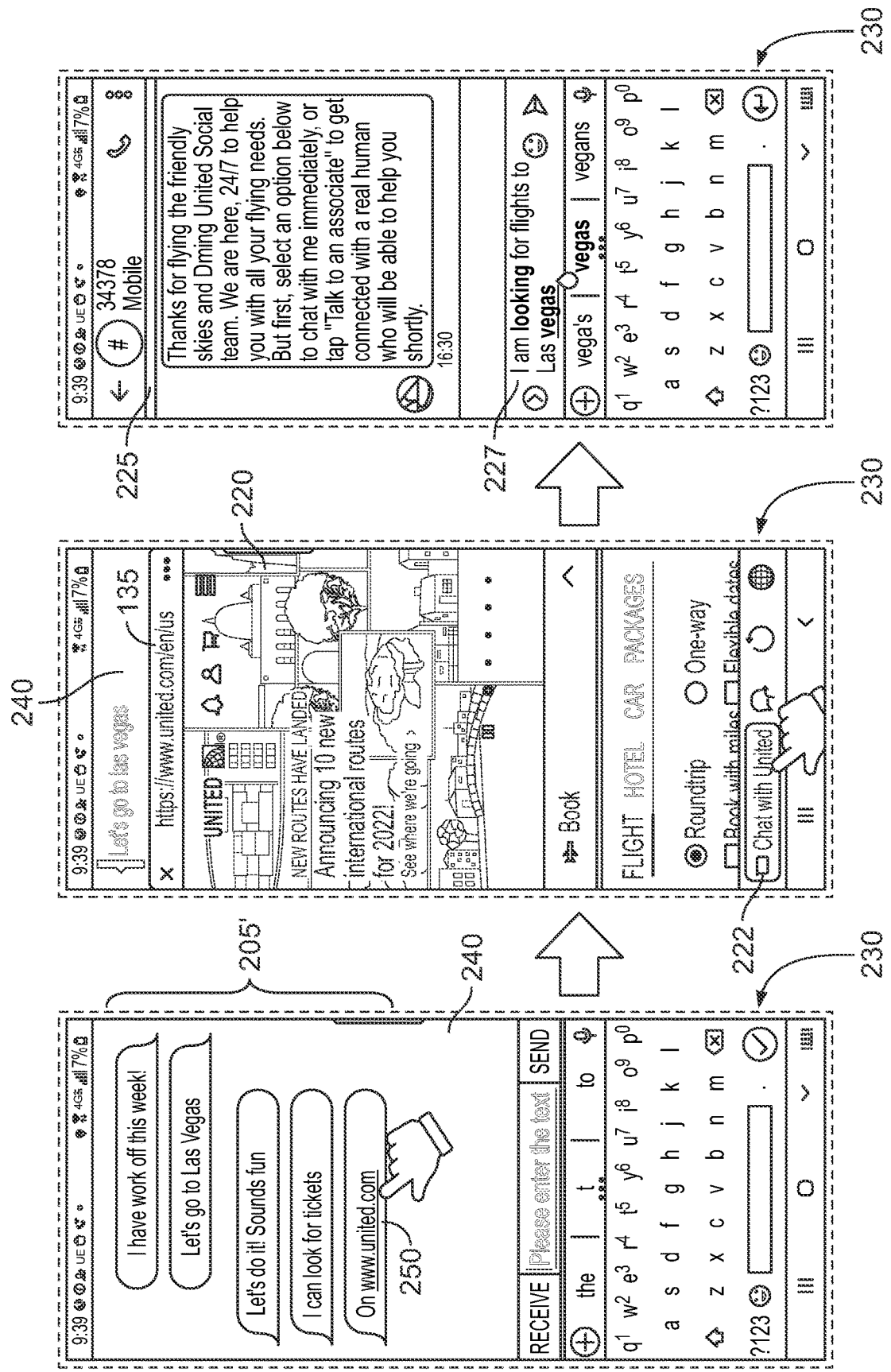
FIG. 2C illustrates another embodiment of the first use case scenario described with respect to FIG. 2A.

In an alternate embodiment, as shown in FIG. 2C, the contextual data 205 (FIG. 2B) may simply constitute a URL 250 such as "www.united.com" input as conversation 205' by the user. In this embodiment, the user may simply click on the URL 250 which may cause the client-side action overlay module 125' to open the web browser 135 on top of the messaging application 240 and load the flight booking webpage 220 (on the website of United Airlines) corresponding to the pointer or URL 250 (of the flight booking webpage 220). In this alternate embodiment, the client-side action overlay module 125' may not generate and display the first "action button" 215 at all. Instead, the client-side action overlay module 125' generates the second "action button" 222 that is displayed in the graphical user interface of the web browser 135 while the flight booking webpage 220 is also in display. The second pointer or URL to, for example, the chatbot application 225 is embedded in the second "action button" 222. When the user clicks the second "action button" 222, the client-side action overlay module 125' causes the chatbot application 225 to be launched on the user's computing device 230 with the smart reply or message 227 ready to be sent to the chatbot application 227.

It should be appreciated that, in some embodiments, the first "action button" 215 is displayed in a graphical user interface, generated by the client-side action overlay module 125', and overlaid on top of the underlying application program, wherein, in some embodiments, the graphical user interface is that of the web browser 135. In alternate embodiments, the client-side action overlay module 125' may be configured to embed the first "action button" 215 directly within the interface of the underlying application program. Also, in some embodiments, the second "action button" 222 is displayed in a graphical user interface, generated by the client-side action overlay module 125', and overlaid on top of the web browser. In alternate embodiments, the second "action button" 222 is embedded within the graphical user interface of the web browser. It should be appreciated that the second "action button" 222 is not embedded within the website or webpage being displayed. That is, the "action button" 222 is not encoded as part of the HTML code of the flight booking webpage 220. In addition, in embodiments, the platform of the present specification is able to detect which native applications a user has installed on their device and thus, the action button can be tailored to that application.

Exemplary Second Use Case Scenario

Figure 2D:
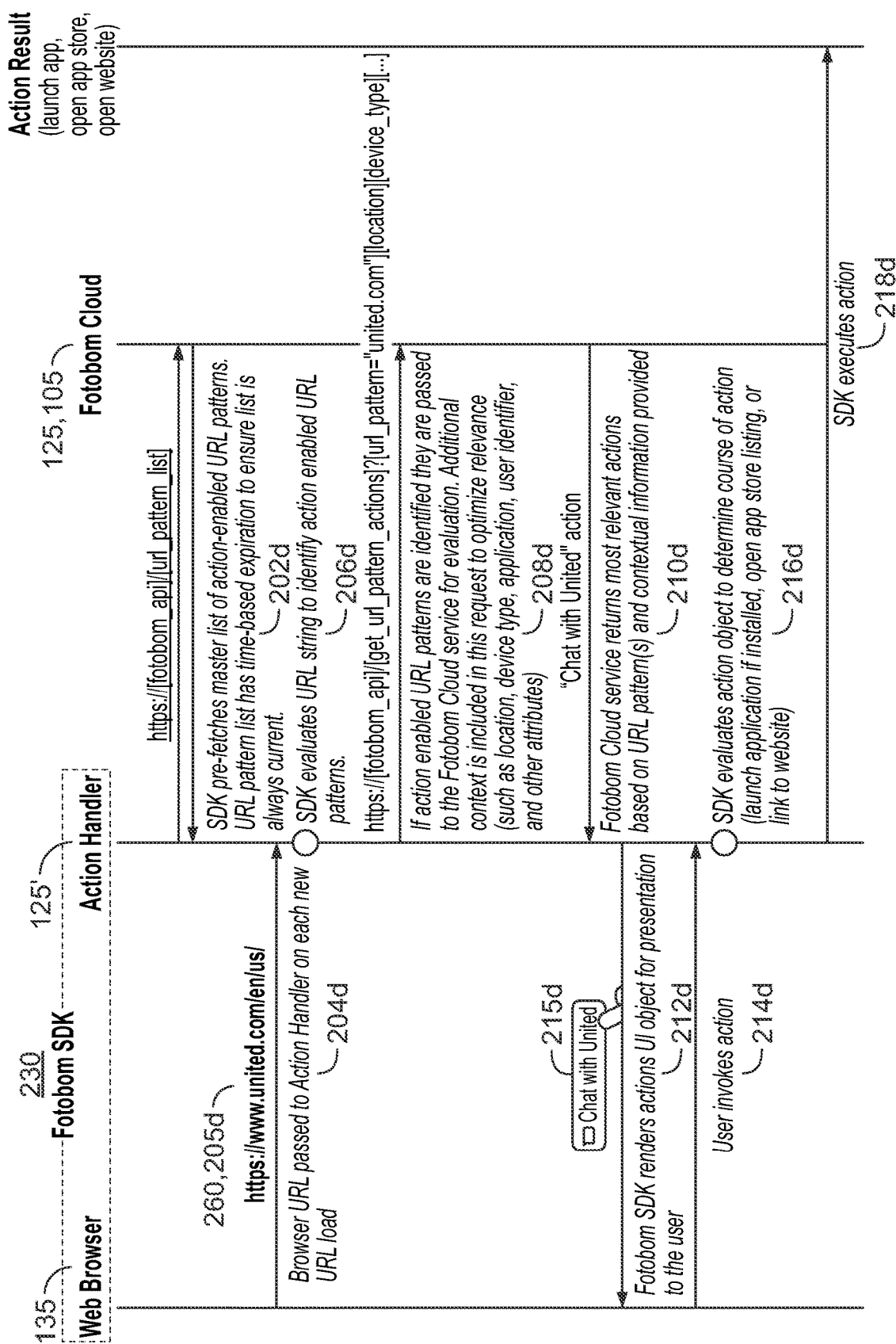
FIG. 2D is a process flow diagram illustrating a second use case scenario, in accordance with some embodiments of the present specification.

FIG. 2D is a process flow corresponding to a second use case scenario, in accordance with some embodiments of the present specification. Referring now to FIGS. 1 and 2D, in the second use case scenario the user accesses the web browser 135 (which is generated by the client-side action overlay module 125') on a user's computing device,—for example, the smartphone 230. The smartphone 230 includes the client-side action overlay module 125' that, when executed, is in data communication with the server-side action overlay module 125 on the first server 105. The user enters a URL 260 (say, https://www.united.com/en/us/) in the web browser 135 thereby generating contextual data 205d which constitutes the content of the URL 260 and/or the content of the website/webpage corresponding to the URL 260 loaded in the web browser 135. It should be noted that the contextual data 205d, in this scenario, is the URL 260 (along with various keywords, phrases, text patterns or strings constituting the URL 260) input by the user in the web browser 135 and/or the content (keywords, phrases, text patterns, strings, expressions, visual symbols or icons) of the website/webpage corresponding to the URL 260 loaded in the web browser 135.

At step 202d, the client-side action overlay module 125' pre-fetches a master list of a plurality of URL patterns or strings as well as a plurality of keywords, phrases, text patterns, visual symbols, and icons (likely associated with the website/webpage corresponding to the URL) from the database system 120. In some embodiments, the master list includes a universal set of all possible URLs, URL patterns as well as keywords or strings constituting the URLs. This master list is updated in real-time to add/remove or activate/deactivate URLs, keywords or strings based on the user's current URL inputs along with the user's historic input and access of URLs. In some embodiments, the master list has time-based expiration to ensure that the list on the smartphone 230 is always current. Since the web browser 135 is generated by and therefore integrated with the client-side action overlay module 125' consequently, at step 204d, the contextual data 205d (that is, the keywords, phrases, text patterns, strings, or expressions corresponding to the URL 260 and/or the content (keywords, phrases, text patterns, strings, expressions, visual symbols or icons) of the website/webpage corresponding to the URL 260) is communicated from the web browser 135 to the module 125' in real-time as the URL 260 is loaded by the web browser 135.

At step 206*d*, the client-side action overlay module 125' evaluates the contextual data 205*d* with respect to the pre-fetched master list of the plurality of URL patterns or strings as well as a plurality of keywords, phrases, text patterns, visual symbols, and icons (likely associated with the website/webpage corresponding to the URL) in order to determine if the contextual data 205*d* includes at least one string or keyword that matches a URL pattern, keyword or string and/or the plurality of keywords, phrases, text patterns, visual symbols, and icons (likely associated with the website/webpage corresponding to the URL) from the master list. It should be noted that various strings or keywords in a URL may also be targeted. For example, if the user is on a URL, for example, www.nfl.com/Patriots, the URL is analyzed to target that a) the user is on "nfl.com" and 2) the keyword "Patriots" is also present in the URL. In the second use case scenario, for example, the string "www.united.com" of the contextual data 205*d* matches the master list of URL patterns or strings.

If a matching string is identified between the contextual data 205*d* and the master list of URL patterns or strings and/or the plurality of keywords, phrases, text patterns, visual symbols, and icons (likely associated with the website/webpage corresponding to the URL) then, at step 208*d*, the matching string is communicated by the client-side action overlay module 125' to the server-side action overlay module 125 at the first server 105. In some embodiments, additional data such as the user attribute data is also communicated by the client-side action overlay module 125' to the server-side action overlay module 125.

In response, the server-side action overlay module 125 determines, from the database system 120, at least one action based on the matching string and the user attribute data and communicates, at step 210*d*, the at least one action back to the client-side action overlay module 125'. In various embodiments, the action may correspond to a pointer or URL directed towards launching another application program and/or another website/webpage on the user's computing device 130. In the second use case scenario, by way of example, the at least one action corresponds to enabling the user to interact with an RCS (Rich Communication Services) chatbot, for example. Therefore, the at least one action corresponds to a pointer or URL to the chatbot application associated with United Airlines.

In various embodiments, the second pointer or URL may link the user to any of a plurality of chatbot types including those chatbots powered by generative artificial intelligence; search chatbots, and/or a Rich Communication Services (RCS) chatbot.

Consequently, at step 212*d*, the client-side action overlay module 125' generates an "action button" 215*d* that is either displayed in a graphical user interface overlaid on top of the web browser 135 (that has the webpage https://www.united.com/en/us/loaded) or is displayed embedded directly in the graphical user interface of the web browser 135. The pointer or URL to the chatbot application is embedded in the "action button" 215*d*. At step 214*d*, the user clicks the "action button" 215*d*. In response to the user clicking the "action button" 215*d*, the client-side action overlay module 125' determines, at step 216*d*, a subsequent course of action and executes the subsequent course of action, at step 218*d*. In various embodiments, the subsequent course of action may involve launching another application program and/or another website/webpage on the user's computing device 130.

In the second use case scenario of FIG. 2D, when the user clicks the "action button" 215*d*, the client-side action overlay module 125' causes the chatbot application to be launched on the user's computing device 130.

Additional Use Case Scenarios

As discussed earlier in the specification, in response to a user clicking an "action button", the client-side action overlay module 125' determines a subsequent course of action depending on the embedded pointer in the "action button". In various embodiments, the subsequent course of action may involve launching another application program and/or another website/webpage on the user's computing device 130, as detailed below in various embodiments.

Figure 3:
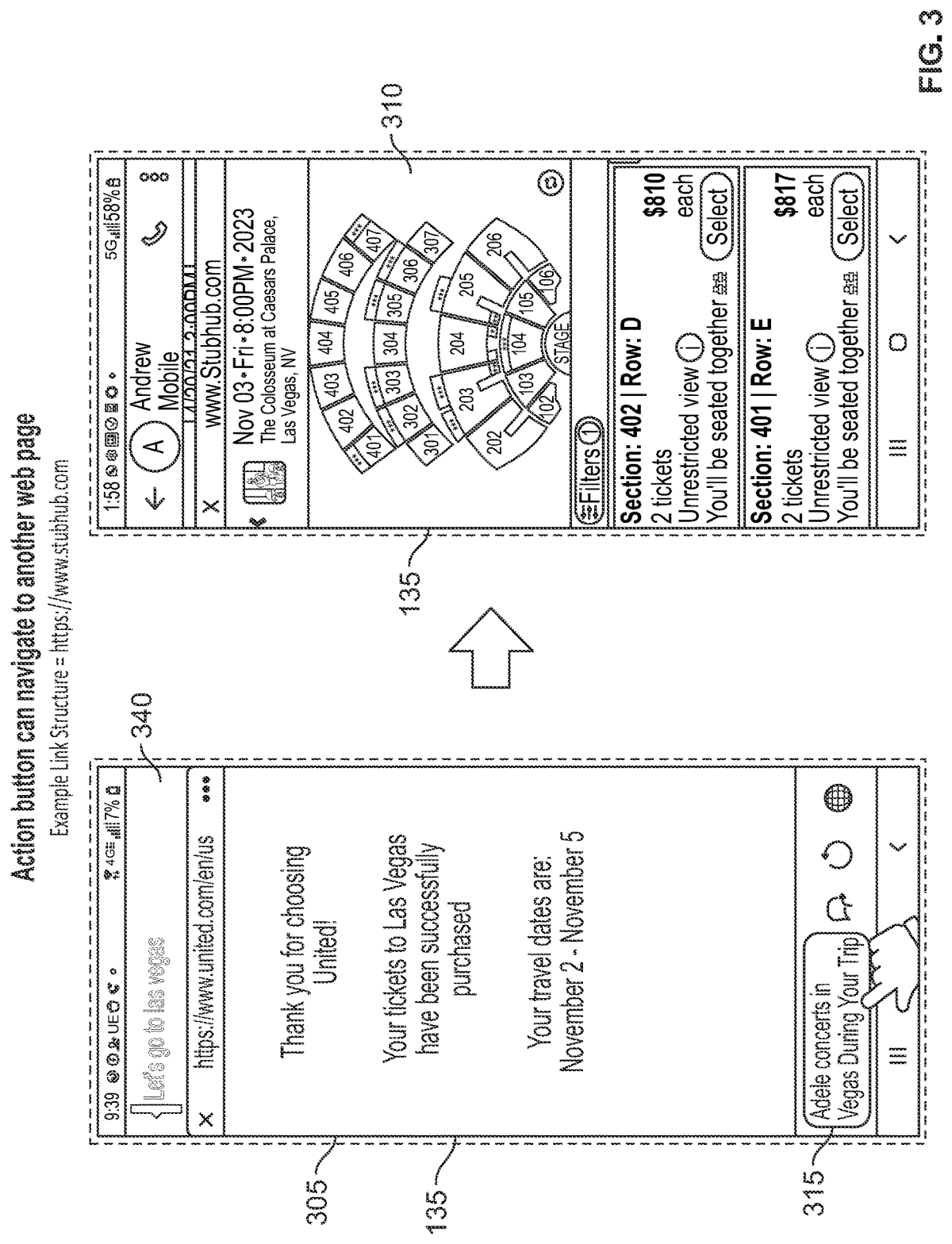

In one embodiment, as shown in FIG. 3, an "action button" 315 is either displayed as overlaid (in a graphical user interface) on top of a website/webpage 305 (that opens in the web browser 135) or the "action button" 315 is displayed embedded directly in the graphical user interface of the web browser 135. The website/webpage 305 opens, within the web browser 135, on top of a messaging application 340, for example. As a non-limiting example, the website/webpage 305 corresponds to a ticket purchase confirmation from united.com. From the URL of the website/webpage 305 as well as the content of the website/webpage 305, a first portion of contextual data is generated comprising a destination of the user (that is, Las Vegas in this example) and the dates of travel (that is, November 2 to November 5). Additionally, a second portion of contextual data is acquired from the database 120, wherein the second portion of contextual data is indicative that the user likes Adele's music and also likes going to concerts. It should be appreciated that the second portion of contextual data is historically stored as a result of recent and past activities of the user. Based at least on the first and second portions of contextual data, in this embodiment, the "action button" 315 titled "Adele Concerts in Vegas During Your Trip" includes an embedded URL pointing to another website/webpage 310 corresponding to Stubhub.com on Adele's concert page. Consequently, when the user clicks the "action button" 315 the client-side action overlay module 125' (FIG. 1) causes the website/webpage 310 to be loaded into the web browser 135.

Figure 4:
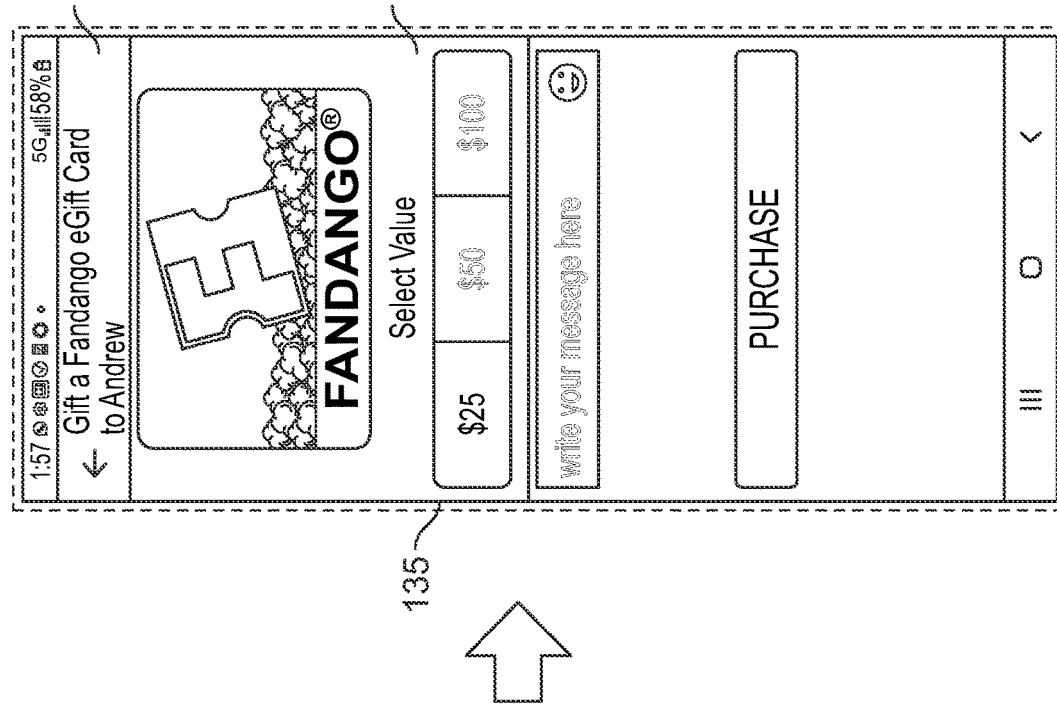
FIG. 4 illustrates a second "action button" that, when selected/clicked, activates or launches a page within an application program, in accordance with some embodiments of the present specification.
Figure 4:
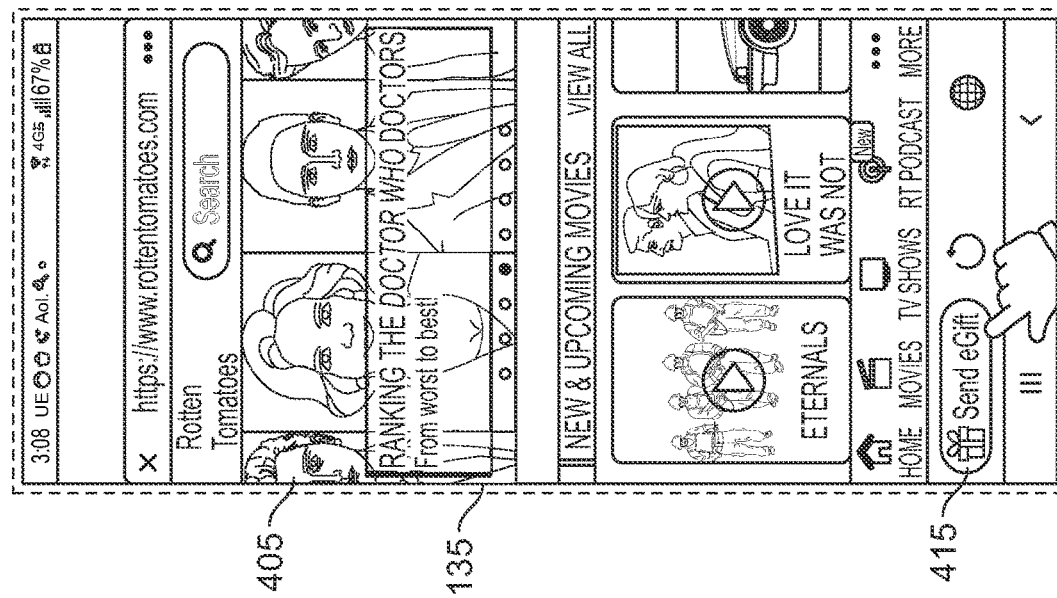

In another embodiment, as shown in FIG. 4, an "action button" 415 is either displayed as overlaid (in a graphical user interface) on top of a website/webpage 405 (that opens in the web browser 135) or the "action button" 415 is displayed embedded directly in the graphical user interface of the web browser 135. Based at least on the URL (that is, contextual data) of the website/webpage 405, in this embodiment, the "action button" 415 titled "Send eGift" includes an embedded URL pointing to a page 410 (of a Fandango eGift card, for example) of an application program 412. Consequently, when the user clicks the "action button" 415 the client-side action overlay module 125' (FIG. 1) is configured to cause the application program 412 to be executed with the page 410 to be loaded into the application program 412. Thus, in this embodiment, the "action button" 415 deep links into a page of an application program.

In yet another embodiment, as shown in FIG. 5A, an "action button" 515 is either displayed as overlaid (in a graphical user interface) on top of a website/webpage 505 (that opens in the web browser 135) showing a plurality of search results or the "action button" 515 is displayed embedded directly in the graphical user interface of the web browser 135 showing the plurality of search results in the website/webpage 505. As shown, the search results correspond to a search query: "Beyonce new songs", for example. Consequently, contextual data is generated based on the search query and/or the content related to the displayed plurality of search results within the website/webpage 505. Based at least on the search query and/or the contextual data corresponding to the plurality of search results of the website/webpage 505, in this embodiment, the "action button" 515 includes an embedded URL pointing to an application program 512. Consequently, when the user clicks the "action button" 515 the client-side action overlay module 125' (FIG. 1) is configured to cause the application program 512 to be executed and opened. Thus, in this embodiment, the "action button" 515 opens an application program. In this embodiment, the web browser 135 takes up an entire screen of the user's computing device.

Figure 5B:
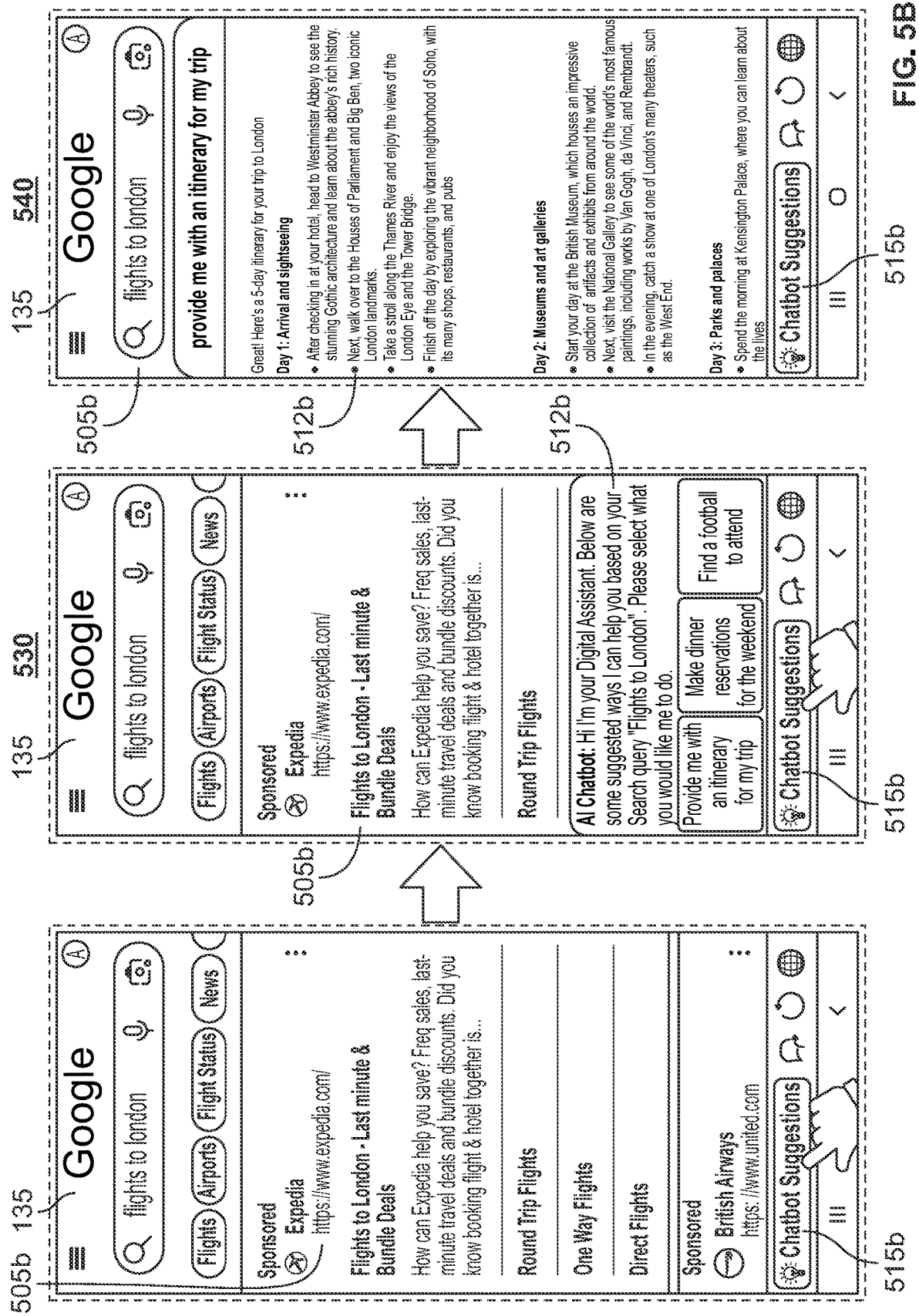
FIG. 5B illustrates yet another "action button" that, when selected/clicked is configured to activate launch a chatbot application program, in accordance with some embodiments of the present specification.

In still another embodiment, as shown in FIG. 5B, an "action button" 515b is either displayed as overlaid (in a graphical user interface) on top of a website/webpage 505b (that opens in the web browser 135) showing a plurality of search results or the "action button" 515 is displayed embedded directly in the graphical user interface of the web browser 135 showing the plurality of search results within the website/webpage 505b. As shown, the search results correspond to a search query: "flights to London", for example. Consequently, contextual data is generated based on the search query and/or the content related to the displayed plurality of search results within the website/webpage 505b. Based at least on the search query and/or the contextual data corresponding to the plurality of search results of the website/webpage 505b, in this embodiment, the "action button" 515b includes an embedded URL pointing to a chatbot application program 512b. Consequently, when the user clicks the "action button" 515 the client-side action overlay module 125' (FIG. 1) is configured to cause the chatbot application program 512b to be executed. In various embodiments, the chatbot application program 512b is any of a plurality of chatbot types including those chatbots powered by generative artificial intelligence; search chatbots, and/or a Rich Communication Services (RCS) chatbot.

As shown in view 530, in some embodiments, execution of the chatbot application program 512b expands either the graphical user interface of the "action button" 515b or the graphical user interface of the web browser 135 in which the "action button" 515b is embedded. The expanded graphical user interface provides a menu of suggested commands (based on the search query and/or the contextual data corresponding to the plurality of search results of the website/webpage 505b) for a generative AI chatbot. Clicking one of the suggested commands, by the user, further expands the graphical user interface, as shown in view 540, to enable the chatbot application program 512b to provide an answer to the clicked command and enable the user to engage in further dialogue with the chatbot application program 512b.

Figure 6:
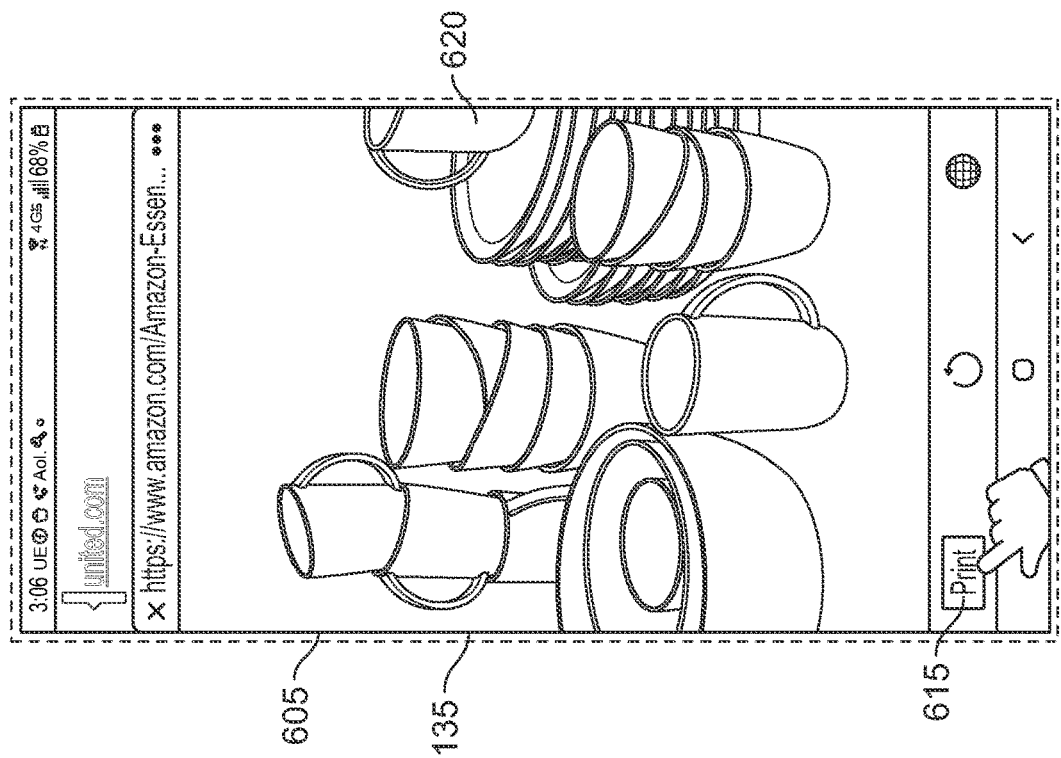
FIG. 6 illustrates a fourth "action button" that, when selected/clicked, evokes a functionality of an application program, in accordance with some embodiments of the present specification.

In still another embodiment, as shown in FIG. 6, an "action button" 615 is either displayed as overlaid (in a graphical user interface) on top of a website/webpage 605 (that opens in the web browser 135) of an e-commerce website or the "action button" 615 is displayed embedded directly within the graphical user interface of the web browser 135 displaying the website/webpage 605 of the e-commerce website. As shown, the website/webpage 605 displays an image 620. In this embodiment, contextual data includes the image 620 detected in the website/webpage 605. In some embodiments, it is further determined, based on recent or historic browsing activities of the user on various websites, that the user is likely interested in the image 620 and would therefore like to save the image 620. Additionally, user attribute data, stored in the database 120, indicates the different types of third-party application programs, such as, for example, Pinterest, installed on the user's computing device. Based on the contextual data and user attribute data, in this embodiment, the "action button" 615 titled "Pin It" is displayed to the user. Accordingly, the "action button" 615 includes an embedded URL or pointer that enables the image 620 on the website/webpage 605 to be saved to the user's account associated with a third-party application program—that is, Pinterest. Consequently, when the user clicks the "action button" 615 the client-side action overlay module 125' (FIG. 1) is configured to cause the image 620 to be saved to the user's account associated with the third-party application program. Thus, in this embodiment, the "action button" 615 evokes a functionality of a third-party application program.

Figure 7:
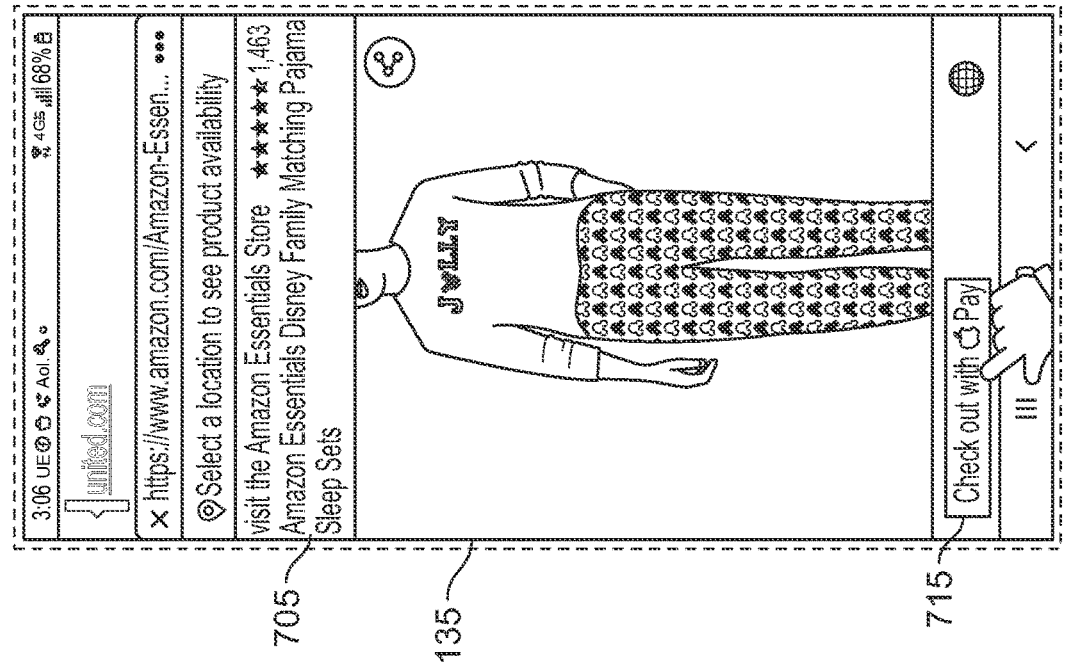
FIG. 7 illustrates a fifth "action button" that, when selected/clicked, evokes a functionality of an application program, in accordance with some embodiments of the present specification.

In still another embodiment, as shown in FIG. 7, an "action button" 715 is either displayed as overlaid (in a graphical user interface) on top of a website/webpage 705 (that opens in the web browser 135) of an e-commerce website or the "action button" 715 is displayed embedded directly in the graphical user interface of the web browser 135 displaying the website/webpage 705 of the e-commerce website. Based on the URL and/or content (that is, contextual data) of the website/webpage 705 indicative of an e-commerce website and hence a likely purchase intent, in this embodiment, the "action button" 715 includes an embedded URL or pointer that enables the user to check out or pay using a third-party application program or using known payment methods (that is, user attribute data) the user has on his computing device. Consequently, when the user clicks the "action button" 715 the client-side action overlay module 125' (FIG. 1) is configured to cause the user to check out using the user's account on the third-party application program. Thus, in this embodiment, the "action button" 715 evokes a functionality of a third-party application program.

Figure 8:
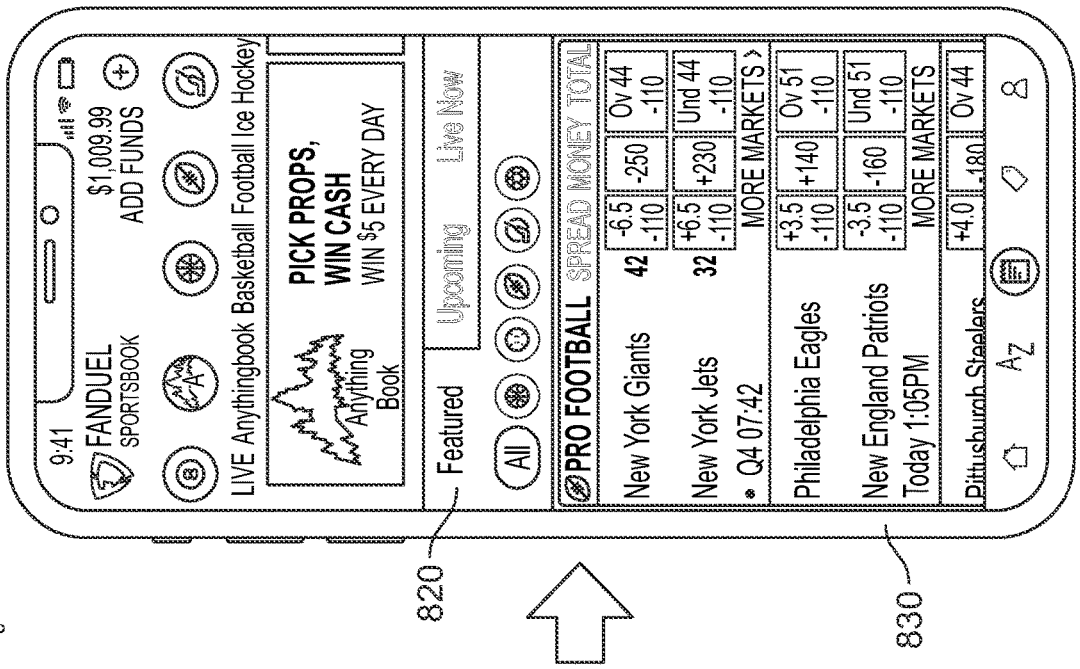
FIG. 8 illustrates a sixth "action button" that, when selected/clicked, activates or launches an application program, in accordance with some embodiments of the present specification.
Figure 8:
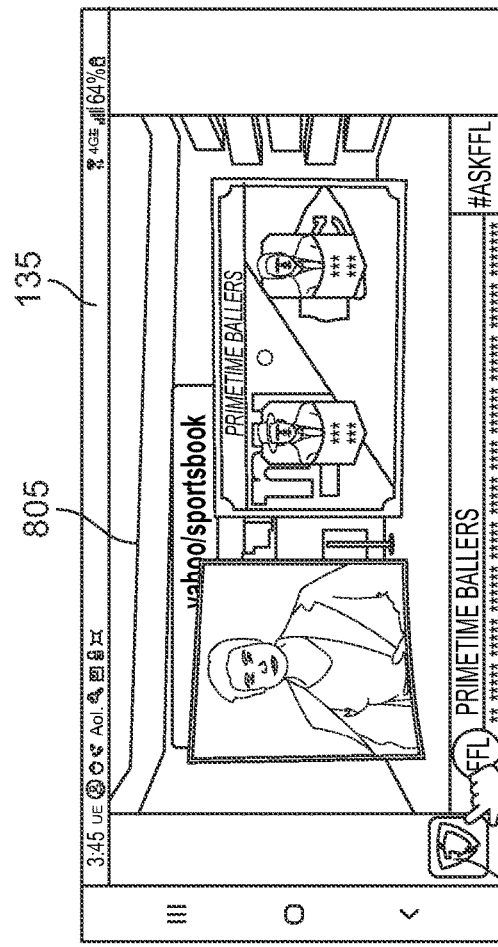

In still another embodiment, as shown in FIG. 8, an "action button" 815 is either displayed as overlaid (in a graphical user interface) on top of a video being playing in a website/webpage 805 (that opens in the web browser 135 or in a media player application) or the "action button" 815 is displayed embedded directly in the graphical user interface of the web browser 135 or the media player application playing the video. In this embodiment, contextual data is generated based on detecting the video being watched by the user and the type of content being streamed in the video. For example, the video is determined to be about sports. Based on the contextual data, in this embodiment, the "action button" 815 includes an embedded URL or pointer that enables the user to navigate to a sports application program 820 (or a sports website) relevant to the video. Consequently, when the user clicks the "action button" 815 the client-side action overlay module 125' (FIG. 1) is configured to cause the sports application program 820 or website to be launched on the user's computing device 830. Thus, in this embodiment, the "action button" 815 evokes a third-party application program.

Figure 9A:
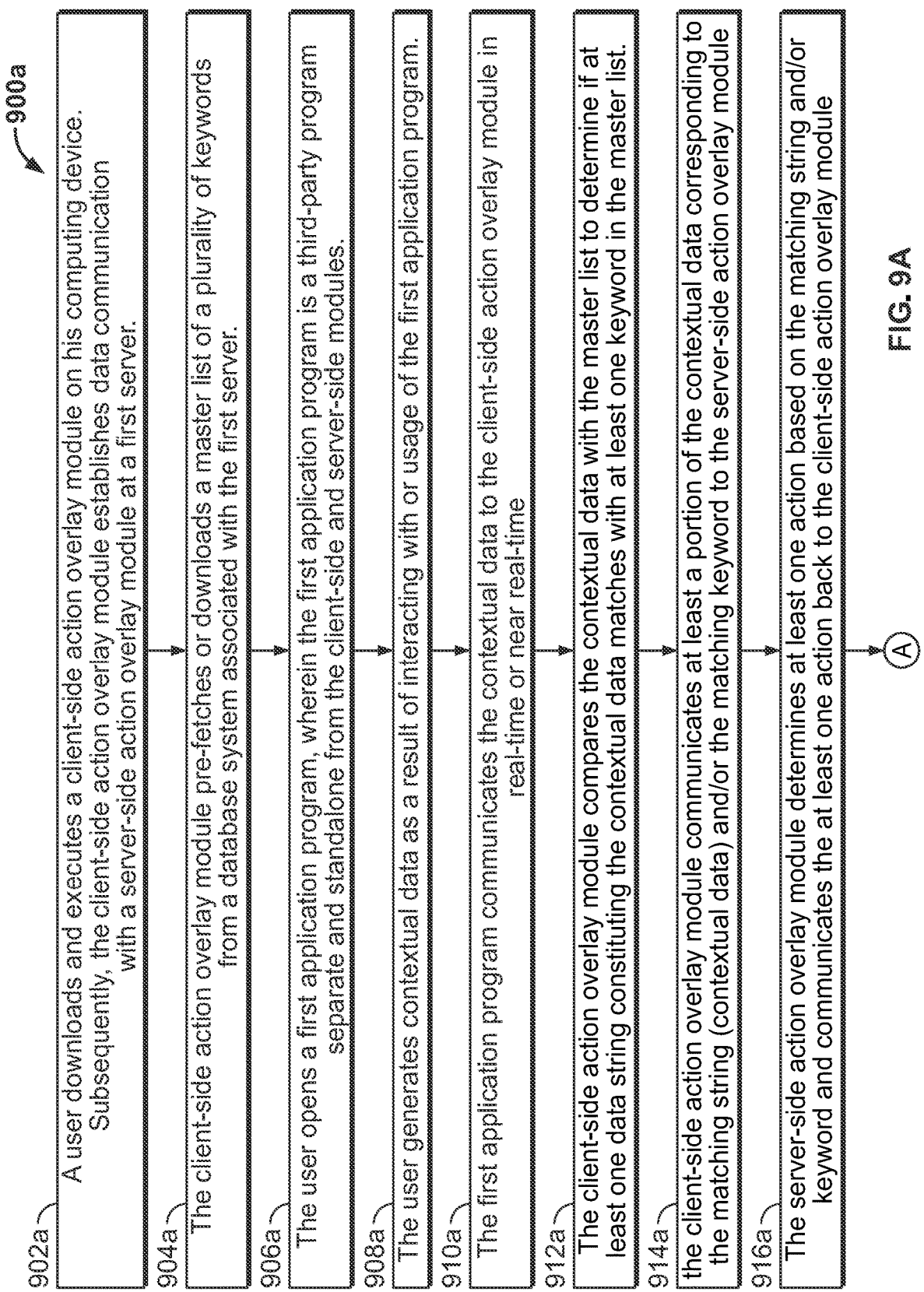
FIG. 9A is a flowchart of a plurality of exemplary steps of a method for generating and displaying at least one context-aware "action button" based on the use of a first application program, in accordance with some embodiments of the present specification.

FIG. 9A is a flowchart detailing a plurality of exemplary steps of a method 900a for generating and displaying at least one context-aware "action button" based on the use of a first application program, in accordance with some embodiments of the present specification. Referring now to FIG. 1 and FIG. 9A, at step 902a, the user downloads (from the first server 105) and executes the client-side action overlay module 125' on their computing device 130. Subsequently, the module 125' establishes data communication with the server-side action overlay module 125 at the first server 105. At step 904a, the module 125' pre-fetches or downloads a master list of a plurality of keywords, phrases, text patterns, expressions, visual symbols, and icons from the database system 120 associated with the first server 105. In some embodiments, the master list has time-based expiration to ensure that the list on the smartphone 130 is always current.

At step 906a, the user opens the first application program, wherein the first application program is a third-party, stand-alone program separate from the modules 125, 125'. In one embodiment, the first application program is a messaging application. At step 908a, the user generates contextual data as a result of interacting with or usage of the first application program. In embodiments, the contextual data includes one or more data strings comprising keywords, phrases, text patterns, expressions, visual symbols, and/or icons. In one embodiments, the contextual data is the content of conversation that the user engages in while using the messaging application.

At step 910a, the first application program is configured to communicate the contextual data to the client-side action overlay module 125' in real-time or near real-time since the first application program integrates with the modules 125 and/or 125' (as part of a business agreement, for example).

At step 912a, the module 125' is configured to compare the contextual data with the master list to determine if at least one data string constituting the contextual data matches with at least one keyword in the master list. If a match is established then, at step 914a, the module 125' is configured to communicate at least a portion of the contextual data corresponding to the matching string (contextual data) and/or the matching keyword to the server-side action overlay module 125. In some embodiments, the module 125' may also communicate user attribute data to the module 125. Alternatively or additionally, the module 125 may fetch user attribute data pre-stored in the database system 120.

In response, at step 916a, the server-side action overlay module 125 determines at least one action based on the matching string and/or keyword and communicates the at least one action back to the client-side action overlay module 125'.

In some embodiments, the server-side action overlay module 125 uses artificial intelligence (AI) and natural language processing to analyze the acquired contextual data and/or user attribute data, synthesize the analyzed contextual data and/or user attribute data in order to determine the user's 'likely intent' in order to determine the at least one action.

Additionally or alternatively, in some embodiments, the at least one action is determined based on one or more actions stored in the database system 120 corresponding to the matching string and/or keyword and the user attribute data.

In various embodiments, the at least one action may correspond to a first pointer or URL directed towards launching a second application program, evoking a functionality of the second application program and/or launching a website/webpage on the user's computing device 130.

Consequently, at step 918a, the client-side action overlay module 125' is configured to generate a first "action button" that is displayed in a graphical user interface overlaid on top of the first application program. In some embodiments, the graphical user interface is that of the web browser 135. Alternatively, the client-side action overlay module 125' is configured to generate the first "action button" that is displayed embedded in the graphical user interface of the first application program. The first pointer or URL is embedded in the first "action button".

At step 920a, when the user clicks the first "action button", the client-side action overlay module 125' is configured to execute a subsequent course of action based on the first pointer or URL. In various embodiments, the subsequent course of action may involve launching another application program, evoking a functionality of the another application program and/or launching a website/webpage on the user's computing device 130.

It should be appreciated that, in some embodiments, a series of additional 'action buttons' may be generated and displayed to the user depending upon the course of action based on the number of actions determined at step 916a. For example, in some embodiments, when the second application program or a website/webpage (loaded in the web browser 135) is launched (in step 920a), the client-side action overlay module 125' may generate and display a second "action button", either in a graphical user interface on top of the second application program or the website/webpage or embedded directly in the second application program or the web browser 135 in which the website/webpage is loaded. A second pointer or URL is embedded in the second "action button" wherein the second pointer or URL may be directed towards launching another application program, evoking a functionality of another application program and/or launching another website/webpage on the user's computing device 130.

It should be appreciated that, in order to generate and display the second "action button" (with the embedded second pointer or URL), the following steps may be followed assuming that the first "action button" causes a website/webpage to be launched in the web browser 135 (that is, the first pointer or URL corresponds to a website/webpage):

a) communicating, via the web browser 135, the first pointer or URL to the module 125' in real-time. Alternatively or additionally, in some embodiments, content of the website/webpage, corresponding to the first pointer or URL, may be communicated to the module 125';

b) fetching, via the module 125', a list of URL patterns from the database system 120. Alternatively or additionally, in some embodiments, a list of keywords, phrases, text patterns, expressions, visual symbols, and icons may be fetched from the database system 120;

c) determining, via the module 125', at least one portion of the first pointer or URL that matches at least one URL pattern from the list of URL patterns. Alternatively or additionally, in some embodiments, a match is determined between the content of the website/webpage and the list of keywords, phrases, text patterns, expressions, visual symbols, and icons;

d) communicating, via the module 125', the matched at least one portion of the first pointer or URL and/or the at least one URL pattern to the server-side action overlay module 125. Alternatively or additionally, in some embodiments, the matched one or more keywords, phrases, text patterns, expressions, visual symbols, and/or icons are communicated to the server-side action overlay module 125;

e) determining, via the module 125, the second action based on the matched at least one portion of the first pointer or URL and/or the at least one URL pattern, wherein the second action includes the second pointer or URL. Alternatively or additionally, in some embodiments, the second action is determined based on the matched one or more keywords, phrases, text patterns, expressions, visual symbols, and/or icons;

f) communicating, via the module 125, the second action to the client-side module 125'; and g) generating, via the client-side module 125', the second "action button" for display on the computing device, wherein the second "action button" is either displayed in a graphical user interface overlaid on top of the website/webpage or is displayed embedded in the graphical user interface of the web browser 135 displaying the website/webpage. As mentioned earlier, the second pointer or URL is embedded in the second "action button", wherein the second pointer or URL may be directed towards launching another application program, evoking a functionality of the another application program and/or launching another website/webpage on the user's computing device 130.

Figure 9B:
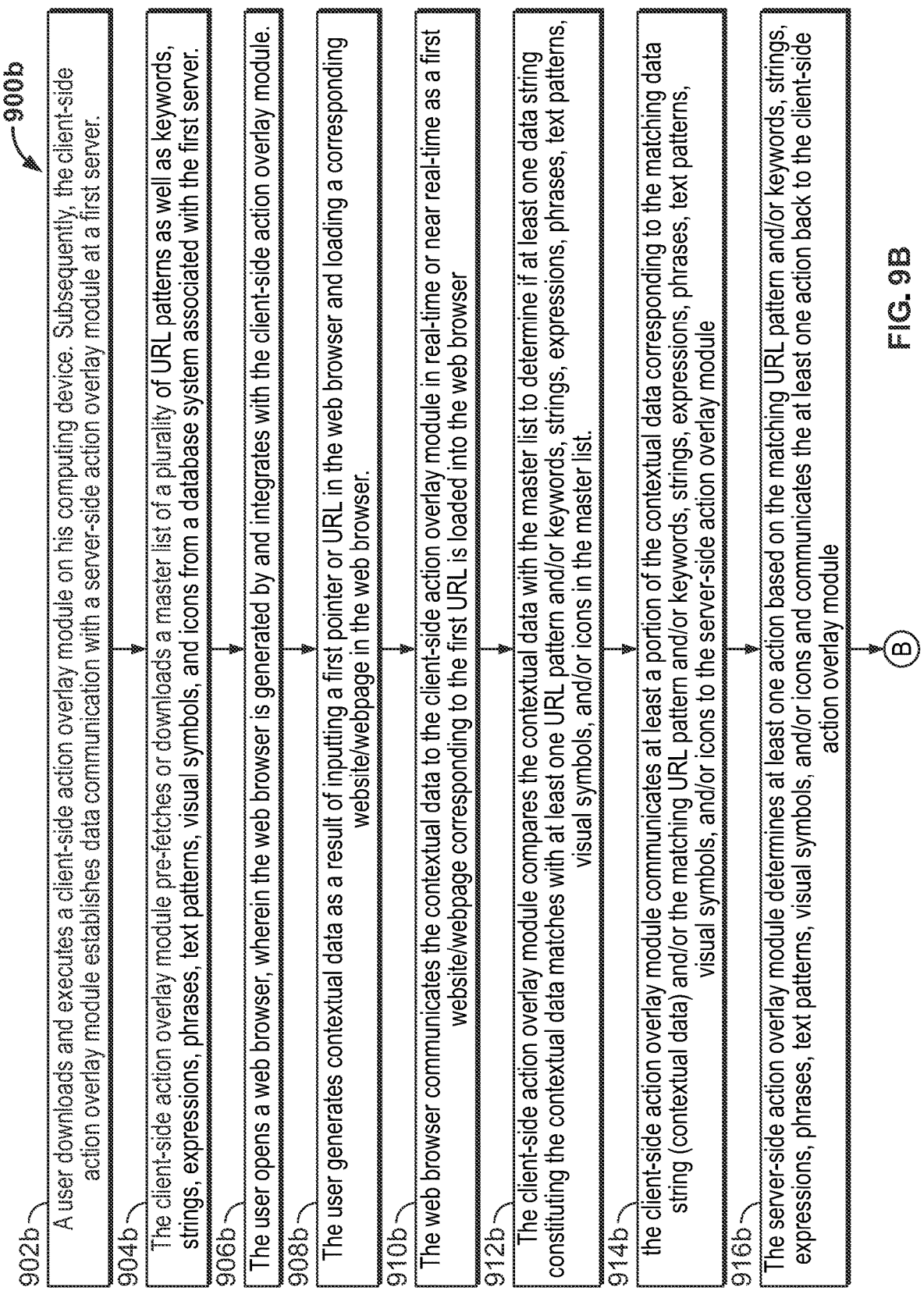
FIG. 9B is a flowchart of a plurality of exemplary steps of a method for generating and displaying at least one context-aware "action button" based on the user accessing a first website/webpage, in accordance with some embodiments of the present specification.
Figure 9B:
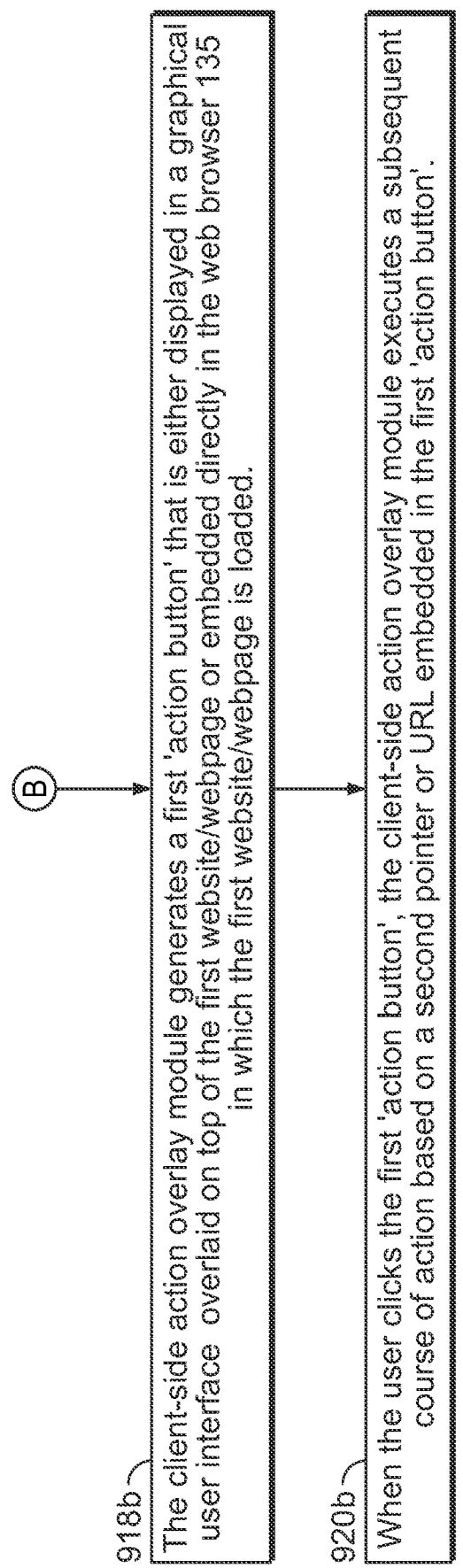

FIG. 9B is a flowchart of a plurality of exemplary steps of a method 900b of generating and displaying at least one context-aware "action button" based on a user accessing a first website/webpage, in accordance with some embodiments of the present specification. Referring now to FIG. 1 and FIG. 9B, at step 902b, the user downloads (from the first server 105) and executes the client-side action overlay module 125' on their computing device 130. Subsequently, the module 125' establishes data communication with the server-side action overlay module 125 at the first server 105. At step 904b, the module 125' is configured to pre-fetch or download a master list of a plurality of URL patterns, as well as keywords, strings, expressions, phrases, text patterns, visual symbols, and icons from the database system 120 associated with the first server 105. In some embodiments, the master list has time-based expiration to ensure that the list on the smartphone 130 is always current.

At step 906b, the user opens the web browser 135, wherein the web browser 135 is generated by and integrates with the module 125'. At step 908b, the user generates contextual data as a result of inputting a first pointer or URL in the web browser 135 and loading a corresponding website/webpage in the web browser 135. In embodiments, the contextual data constitutes the first URL and/or keywords, strings, expressions, phrases, text patterns, visual symbols, and/or icons based on content of the website/webpage corresponding to the first URL.

At step 910b, the web browser 135 communicates the contextual data to the client-side action overlay module 125' in real-time or near real-time as the first website/webpage corresponding to the first URL is loaded into the web browser 135.

At step 912b, the module 125' is configured to compare the contextual data with the master list to determine if at least one data string constituting the contextual data matches with at least one URL pattern, and/or keywords, strings, expressions, phrases, text patterns, visual symbols, and/or icons in the master list. If a match is established then, at step 914b, the module 125' is configured to communicate at least a portion of the contextual data corresponding to the matching URL pattern, and/or keywords, strings, expressions, phrases, text patterns, visual symbols, and/or icons to the server-side action overlay module 125. In some embodiments, the module 125' may also communicate user attribute data to the module 125. Alternatively or additionally, the module 125 may fetch user attribute data pre-stored in the database system 120.

In response, at step 916b, the server-side action overlay module 125 is configured to determine at least one action based on the matching URL pattern, and/or keywords, strings, expressions, phrases, text patterns, visual symbols, and/or icons and communicates the at least one action back to the client-side action overlay module 125'.

In some embodiments, the server-side action overlay module 125 uses artificial intelligence (AI) and natural language processing to analyze the acquired contextual data and/or user attribute data, synthesize the analyzed contextual data and/or user attribute data in order to determine the user's 'likely intent' in order to determine the at least one action.

Additionally or alternatively, in some embodiments, the at least one action is determined based on one or more actions stored in the database system 120 corresponding to the matching URL pattern, and/or keywords, strings, expressions, phrases, text patterns, visual symbols, and/or icons and the user attribute data. In various embodiments, the at least one action may correspond to a second pointer or URL directed towards launching an application program, evoking a functionality of the application program and/or launching a second web site/webpage on the user's computing device 130.

Consequently, at step 918b, the client-side action overlay module 125' is configured to generate a first "action button" that is either displayed in a graphical user interface overlaid on top of the first website/webpage or embedded directly in the web browser 135 in which the first website/webpage is loaded. The second pointer or URL is embedded in the first "action button".

At step 920b, when the user clicks the first "action button", the client-side action overlay module 125' is configured to execute a subsequent course of action based on the second pointer or URL. In various embodiments, the subsequent course of action may involve launching an application program, evoking a functionality of the application program and/or launching a second website/webpage on the user's computing device 130.

It should be appreciated that, in some embodiments, a series of additional 'action buttons' may be generated and displayed to the user depending upon the course of action based on the number of actions determined at step 916b. For example, in some embodiments, when an application program or a second website/webpage (loaded in the web browser 135) is launched (in step 920b), the client-side action overlay module 125' may generate and display a second "action button". In some embodiments, the second "action button" is displayed in a graphical user interface, overlaid on top of the application program or the second website/webpage. In alternate embodiments, the second "action button" is embedded directly in the graphical user interface of the application program or of the web browser 135 loading the second website/webpage. A third pointer or URL is embedded in the second "action button" wherein the third pointer or URL may be directed towards launching a second application program, evoking a functionality of the second application program and/or launching another website/webpage on the user's computing device 130.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A method of generating and displaying a graphical user interface object in response to a user using a first application program on a computing device, wherein the computing device executes a client-side module in data communication with a server-side module implemented on at least one server, and wherein the first application program is in data communication with the client-side module, the method comprising:
fetching, via the client-side module, first data from a database associated with the at least one server;
generating contextual data based on a usage of the first application program;
communicating, using the first application program, the contextual data to the client-side module in real-time;
determining, using the client-side module, at least one portion of the contextual data based on the first data or at least one portion of the first data based on the contextual data;
communicating, using the client-side module, the determined at least one portion of the contextual data and/or at least one portion of the first data to the server-side module;
determining, using the server-side module, at least one action based on the at least one portion of the contextual data and/or the at least one portion of the first data, wherein the at least one action includes causing an interface in the computing device to electronically navigate to a virtual location based on a pointer, a virtual address, or a URL;
communicating, using the server-side module, the at least one action to the client-side module; and
generating, using the client-side module, the graphical user interface object for display on the computing device, wherein the graphical user interface object is visually overlaid on top of the first application program and wherein, when the graphical user interface object is activated, the computing device is caused to engage in the at least one action by electronically navigating, via said interface, to the virtual location based on the pointer, the virtual address, or the URL.

2. The method of claim 1, wherein the pointer or the URL is embedded in the graphical user interface object.

3. The method of claim 1, wherein the virtual location corresponds to a second application program, and wherein, when the graphical user interface object is activated, the client-side module causes the second application program to be launched on the computing device.

4. The method of claim 3, further comprising generating, using the client-side module, a second graphical user interface object for display on the computing device, wherein the second graphical user interface object is visually overlaid on the second application program.

5. The method of claim 4 wherein, when the second graphical user interface object is activated, the computing device is caused to engage in the at least one action by electronically navigating, via said interface, to a chatbot application.

6. The method of claim 1, wherein the virtual location corresponds to a functionality of a second application program, and wherein, when the graphical user interface object is activated, the client-side module evokes the functionality of the second application program on the computing device.

7. The method of claim 1, wherein the virtual location corresponds to a website or webpage, and wherein, when the graphical user interface object is activated, the client-side module causes the website or webpage to be launched in a web browser on the computing device.

8. The method of claim 7, wherein the web browser is implemented by the client-side module, and wherein the graphical user interface object is embedded in a graphical user interface of the web browser.

9. The method of claim 1, wherein the virtual location corresponding to the at least one action is determined based at least in part on data characterizing one or more user attributes, wherein the data indicative of one or more user attributes comprises at least one of a current location of the user, a date and a time associated with the computing device of the user, a type of the computing device of the user, data indicative of one or more application programs installed on the computing device of the user, an Internet service provider of the user, or the user's demographic information.

10. The method of claim 1, wherein the first data comprises a list of keywords.

11. The method of claim 10, wherein the determining, using the client-side module, of at least one portion of the contextual data based on the first data comprises matches at least one portion of the contextual data to at least one of the keywords from the list.

12. The method of claim 1, wherein the first data is based at least partially on the user's interaction with the first application program.

13. The method of claim 1, wherein the first application program is a messaging application program.

14. The method of claim 13, wherein the first data comprises one or more of keywords, phrases, text patterns, visual symbols, and icons based on the user's real-time conversation with another user via the messaging application.

15. The method of claim 13, wherein the first data comprises the user's historic use of word patterns and expressions on the messaging application.

16. The method of claim 1, further comprising fetching, via the client-side module, first data comprising at least a master list of a plurality of keywords, phrases, text patterns, expressions, visual symbols, and icons from a database associated with the at least one server.

17. The method of claim 16, wherein the master list comprises a set of possible keywords, phrases, text patterns, expressions, visual symbols, and icons, wherein the master list is updated in real-time to add, remove, activate or deactivate the keywords, phrases, text patterns, expressions, visual symbols, and icons based on the user's current interaction with another user via the first application program and the user's historic usage of words and phrases during the interaction.

18. The method of claim 17, wherein via the client-side module, the contextual data is evaluated with respect to the master list for determining if the contextual data comprises at least one string that matches one or more of said keywords, phrases, text patterns, expressions, visual symbols, and icons from the master list.

19. The method of claim 18, wherein the at least one string that matches one or more of keywords, phrases, text patterns, expressions, visual symbols, and icons from the master list is communicated to the server-side module via the client-side module.

20. The method of claim 1, wherein generating, using the client-side module, the graphical user interface object for display on the computing device further comprises generating a first action button that is displayed in a graphical user interface overlaid over the first application program.

* * * * *